US010615439B2

(12) United States Patent
Barnard et al.

(10) Patent No.: US 10,615,439 B2
(45) Date of Patent: Apr. 7, 2020

(54) FUEL CELL STACK AND STEAM REFORMER SYSTEMS AND METHODS

(71) Applicant: Ceres Intellectual Property Company Limited, Horsham, West Sussex (GB)

(72) Inventors: Paul Barnard, Horsham (GB); Mark Selby, Horsham (GB); Andrew Hazell, Horsham (GB); Christopher John Evans, Horsham (GB)

(73) Assignee: CERES INTELLECTUAL PROPERTY COMPANY LIMITED, Horsham (GB)

( * ) Notice: Subject to any disclaimer, the term of this patent is extended or adjusted under 35 U.S.C. 154(b) by 522 days.

(21) Appl. No.: 14/904,087

(22) PCT Filed: Jun. 20, 2014

(86) PCT No.: PCT/GB2014/051908
§ 371 (c)(1),
(2) Date: Jan. 9, 2016

(87) PCT Pub. No.: WO2015/004419
PCT Pub. Date: Jan. 15, 2015

(65) Prior Publication Data
US 2016/0141692 A1    May 19, 2016

(30) Foreign Application Priority Data

Jul. 9, 2013 (GB) .................................. 1312329.4

(51) Int. Cl.
*H01M 8/0612* (2016.01)
*H01M 8/04746* (2016.01)
(Continued)

(52) U.S. Cl.
CPC ..... *H01M 8/0618* (2013.01); *H01M 8/04014* (2013.01); *H01M 8/04022* (2013.01);
(Continued)

(58) Field of Classification Search
None
See application file for complete search history.

(56) References Cited

U.S. PATENT DOCUMENTS

2002/0155331 A1* 10/2002 Kamegaya ........ H01M 8/04223
429/412
2008/0020247 A1* 1/2008 Valensa ..................... F28D 7/10
429/439

(Continued)

FOREIGN PATENT DOCUMENTS

CN    1504707 A        6/2004
EP    1 251 022 A1    10/2002
(Continued)

OTHER PUBLICATIONS

Shah, R. K. and Sekulic, D. P., Classification of Heat Exchangers, in Fundamentals of Heat Exchanger Design, John Wiley & Sons, Inc., Hoboken, NJ USA, Published Online Nov. 6, 2007 and accessed at http://onlinelibrary.wiley.com/doi/10.1002/9780470172605.ch1/summary.*

(Continued)

*Primary Examiner* — Amanda J Barrow
(74) *Attorney, Agent, or Firm* — SGPatents PLLC

(57) ABSTRACT

The present invention is concerned with improved fuel cell systems and methods. The present invention provides an intermediate-temperature solid oxide fuel cell (IT-SOFC) system comprising: (i) at least one fuel cell stack comprising at least one intermediate-temperature solid oxide fuel cell, and having an anode inlet, a cathode inlet, an anode off-gas outlet, a cathode off-gas outlet, and defining separate flow paths for flow of anode inlet gas, cathode inlet gas, anode off-gas and cathode off-gas; and (ii) a steam reformer for reforming a hydrocarbon fuel to a reformate, and having a reformer inlet for anode inlet gas, a reformer outlet for exhausting anode inlet gas, and a reformer heat exchanger;

(Continued)

and defining: (a) an anode inlet gas fluid flow path from a fuel source to said steam reformer to said at least one fuel cell stack anode inlet; (b) an anode off-gas fluid flow path from said at least one fuel cell stack anode off-gas outlet to a fuel cell system exhaust; (c) a cathode inlet gas fluid flow path from an at least one oxidant inlet to said reformer heat exchanger to said at least one fuel cell stack cathode inlet; and (d) a cathode off-gas fluid flow path from said at least one fuel cell stack cathode off-gas outlet to said fuel cell system exhaust; wherein said reformer heat exchanger is a parallel-flow heat exchanger in fluid flow communication with (i) said at least one oxidant inlet and said at least one fuel cell stack cathode inlet, and (ii) said fuel source and said at least one fuel cell stack anode inlet, and is arranged for exchanging heat between said cathode inlet gas and said anode inlet gas.

20 Claims, 6 Drawing Sheets

(51) Int. Cl.
  *H01M 8/04701*    (2016.01)
  *H01M 8/04014*    (2016.01)
  *H01M 8/0432*     (2016.01)
  *H01M 8/124*      (2016.01)

(52) U.S. Cl.
  CPC ..... *H01M 8/0435* (2013.01); *H01M 8/04335* (2013.01); *H01M 8/04708* (2013.01); *H01M 8/04753* (2013.01); *H01M 2008/1293* (2013.01)

(56) References Cited

U.S. PATENT DOCUMENTS

| | | | | |
|---|---|---|---|---|
| 2008/0118800 A1* | 5/2008 | Devriendt | ......... | H01M 8/04014 429/423 |
| 2009/0191434 A1* | 7/2009 | Kading | ............. | H01M 8/04014 429/411 |
| 2010/0239924 A1* | 9/2010 | McElroy | ........... | H01M 8/04007 429/423 |
| 2010/0261073 A1 | 10/2010 | Wang et al. | | |
| 2011/0045366 A1 | 2/2011 | Takeuchi et al. | | |
| 2013/0244126 A1* | 9/2013 | Kobayashi | .......... | H01M 8/0606 429/423 |
| 2016/0079622 A1* | 3/2016 | Yoshimine | ................ | C01B 3/38 429/415 |

FOREIGN PATENT DOCUMENTS

| | | | | |
|---|---|---|---|---|
| EP | 2 763 228 A1 | 8/2014 | | |
| GB | 2 411 043 A | 8/2005 | | |
| JP | 2010-503158 A | 1/2010 | | |
| KR | 10-1205538 B1 | 11/2012 | | |
| RU | 2 379 796 C1 | 1/2010 | | |
| WO | WO 03/107463 A2 | 12/2003 | | |
| WO | WO 2004/100299 A2 | 11/2004 | | |
| WO | WO 2007/110587 A2 | 10/2007 | | |
| WO | WO 2008/053213 A1 | 5/2008 | | |
| WO | WO 2009/034449 A2 | 3/2009 | | |
| WO | WO 2013/046582 | * | 4/2013 | ............. H01M 8/04 |
| WO | WO 2013/046582 A1 | 4/2013 | | |

OTHER PUBLICATIONS

Office Action dated Aug. 30, 2017, in Chinese Patent Application No. 20148003953.1.
International Preliminary Report on Patentability from International Patent Application No. PCT/GB2014/051908, dated Jan. 21, 2016.
International Search Report dated Sep. 11, 2014, in International Application No. PCT/G82014/051908.
Written Opinion of International Searching Authority dated Sep. 11, 2014, in International Application No. PCT/GB2014/051908.
Search Report dated Aug. 20, 2014, in GB Patent Application No. 1411073.8.
Search Report completed Jan. 25, 2018, in Russian Patent Application No. 2016103900.
Office Action dated Mar. 6, 2018, in Japanese Patent Application No. 2016-524887.

* cited by examiner

FUEL CELL STACK AND STEAM REFORMER SYSTEMS AND METHODS

FIELD OF THE INVENTION

The present invention is concerned with improved fuel cell systems and methods.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO02/35628, WO03/07582, WO2004/089848, WO2005/078843, WO2006/079800, WO 2006/106334, WO 2007/085863, WO 2007/110587, WO 2008/001119, WO 2008/003976, WO2008/015461, WO2008/053213, WO2008/104760, WO2008/132493, WO2009/090419, WO2010/020797, and WO2010/061190, which are incorporated herein by reference in their entirety. Definitions of terms used herein can be found as necessary in the above publications. In particular, the present invention seeks to improve the systems and methods disclosed in WO2008/053213.

Operating hydrocarbon fuelled SOFC (solid oxide fuel cell) systems where the fuel cell stack operates in the 450-650 Deg C. range (intermediate-temperature solid oxide fuel cell; IT-SOFC), more particularly in the 520-620 Deg C. temperature range, results in a different set of technical problems being encountered and requires a different approach as compared to higher temperature SOFC technology such as YSZ (yttria-stabilised zirconia) based technologies which typically operate at temperatures >720 Deg C.

The lower fuel cell stack operating temperature does not lend itself to high levels of internal reforming of fuel and thus such systems typically require high levels of reforming prior to fuel reaching the fuel cell stack.

In such systems, steam reforming is used to convert a hydrocarbon fuel stream into a hydrogen-rich reformate stream which is fed to the fuel cell stack anode inlet. The reformer is typically operated in a temperature range of 620-750 Deg C. such that the output reformate is in the temperature range 500-750 Deg C., allowing reforming of over 80% of the hydrocarbon (such as natural gas). The reformate stream is then cooled to about 350-550 Deg C. for entry into the fuel cell stack at about 450 Deg C. The reformer is typically heated by the output of the tail-gas burner which combusts the fuel cell stack off-gases.

IT-SOFC stack cooling is achieved mainly through control of the oxidant flow over the cathode side of the fuel cell stack (i.e. to effect increased cooling, more air is blown over the cathode side of the fuel cell stack). This is different to other SOFC technologies where higher levels of internal reforming occur and where the resulting endothermic effect of the internal reforming reaction acts to absorb thermal energy released from the operating fuel cell.

To achieve the above high reformer temperature, the reformer is usually closely thermally coupled with the fuel cell stack tail-gas burner (which burns any remaining fuel in the anode off-gas in oxidant, typically by combusting with the hot cathode off-gas). In such an arrangement, the tail-gas burner and its hot exhaust gas are closely thermally coupled with the reformer by way of a heat exchanger such as a heat exchange surface. Typically, the reformer is arranged so that it is immediately adjacent to or in contact with the tail-gas burner in order that as much heat as possible is passed from the tail-gas burner to the reformer.

The present inventors have identified a number of technical limitations which affect current IT-SOFC fuel cell stack arrangements:

1. IT-SOFC Degradation Leads to a Significant Non-Linear Loss of Fuel Cell Stack Efficiency During the life of a fuel cell, degradation in the fuel cell leads to a loss of electrical efficiency, and therefore an increased heat production for a given electrical power output. Controlling fuel cell stack operating temperature is critical for fuel cell stack operating performance. For a fuel cell system, the delivery of fuel cell stack cooling (in particular by pumps/blowers to the cathode side of the fuel cell) is a substantial system parasitic load (typically, the largest system parasitic load). As fuel cells degrade, this combination of loss of efficiency and increased parasitic load provides a disproportionate (i.e. a greater than linear, also referred to herein as a non-linear) reduction in efficiency at the system level.

Further, as the fuel cell stack provides the electrical power to provide fuel cell stack cooling, a positive feedback mechanism (i.e. a vicious cycle) is initiated by a loss of fuel cell efficiency, i.e. the fuel cell stack is less efficient and generates more heat for a given electrical output, and therefore needs more cooling which results in an increased power demand, requiring increased power generation, in turn resulting in further increase in heat generation requiring a further increase in cooling.

2. Close Thermal Coupling of the Reformer to the Tail-Gas Burner Results in Increased Fuel Cell Stack Cooling Load Close thermal coupling of the (endothermic) fuel reformer to the tail-gas burner (TGB) means that the enthalpy of the fuel flow leaving the fuel reformer is a function of the total airflow to the fuel cell stack. With IT-SOFC degradation, the increased electrical resistance and thus increased fuel cell heat generation results in increasing reformer temperature and thus increasing hydrogen content in the reformed fuel, in turn increasing the fuel cell stack cooling load during fuel cell stack operation.

Without supplementary heat recuperation for the anode inlet gas between the between the reformer outlet and the fuel cell stack anode inlet, this increased thermal energy is transferred to the fuel cell stack as additional cooling load, which further increases gross power requirements and results in a further decrease in fuel cell system efficiency.

3. Carbon Monoxide Produced as a Product of Reformation Causes Carbon Drop-Out and Metal Dusting, Resulting in Degradation to the Fuel Cell Stack Anode Side Carbon drop-out from reformed fuel has a significant negative effect upon fuel cell stack performance, particularly during extended use. As reformate containing carbon monoxide exits the reformer and passes to the IT-SOFC stack anode inlet, it typically undergoes a significant decrease in temperature due to the fact that reformers are usually operated at a high temperature in order to achieve a high level of reformation. As a result of that temperature decrease, the equilibrium between carbon monoxide and carbon dioxide shifts in favour of carbon dioxide—the Boudouard Reaction takes place, carbon monoxide is oxidized into carbon dioxide, and carbon precipitates, i.e. carbon drop-out occurs. This carbon drop-out is in the form of (i) particulate carbon, which can coat surfaces and block/restrict fluid flow paths, and (ii) metal dusting ("Corrosion by Carbon and Nitrogen: Metal Dusting, Carburisation and Nitridation", edited by H. J. Grabke and M. Schütze, 2007, ISBN 9781845692322) where the carbon forms on the surface of exposed metal surfaces of components, resulting in metal being removed from the body of the component over time with a corresponding negative impact on the component specification.

These limitations are typically not seen in higher temperature fuel cell systems because a degree of internal reforming is capable and indeed desirable to reduce blower parasitic loads and any external reformate is inevitably much closer to fuel cell stack operating temperature and thus does not require cooling through the Boudouard Reaction temperature range.

The present invention seeks to address, overcome or mitigate at least one of the prior art disadvantages.

SUMMARY OF THE INVENTION

According to the present invention there is provided an intermediate-temperature solid oxide fuel cell (IT-SOFC) system and methods of operating an IT-SOFC as defined in the appended independent claims. Further preferable features are defined in the appended dependent claims.

According to a first aspect of the present invention there is provided an intermediate-temperature solid oxide fuel cell (IT-SOFC) system comprising:
(i) at least one fuel cell stack comprising at least one intermediate-temperature solid oxide fuel cell, and having an anode inlet, a cathode inlet, an anode off-gas outlet, a cathode off-gas outlet, and defining separate flow paths for flow of anode inlet gas, cathode inlet gas, anode off-gas and cathode off-gas; and
(ii) a steam reformer for reforming a hydrocarbon fuel to a reformate, and having a reformer inlet for anode inlet gas, a reformer outlet for exhausting anode inlet gas, and a reformer heat exchanger;
and defining:
(a) an anode inlet gas fluid flow path from a fuel source to said steam reformer to said at least one fuel cell stack anode inlet;
(b) an anode off-gas fluid flow path from said at least one fuel cell stack anode off-gas outlet to a fuel cell system exhaust;
(c) a cathode inlet gas fluid flow path from an at least one oxidant inlet to said reformer heat exchanger to said at least one fuel cell stack cathode inlet; and
(d) a cathode off-gas fluid flow path from said at least one fuel cell stack cathode off-gas outlet to said fuel cell system exhaust;
wherein said reformer heat exchanger is a parallel-flow heat exchanger in fluid flow communication with (i) said at least one oxidant inlet and said at least one fuel cell stack cathode inlet, and (ii) said fuel source and said at least one fuel cell stack anode inlet, and is arranged for exchanging heat between said cathode inlet gas and said anode inlet gas.

Reference herein to method steps is also reference to the system of the present invention adapted or configured to perform such method steps.

For the avoidance of doubt, reference herein to parallel flow heat exchangers is to co-flow heat exchangers.

Preferably, the at least one fuel cell stack is a metal-supported IT-SOFC stack, more preferably as taught in U.S. Pat. No. 6,794,075. Preferably, the IT-SOFC has a steady state operating temperature in the range 400 Deg C.-650 Deg C., more preferably 450 Deg C.-650 Deg C., more preferably 520-620 Deg C.

Preferably, each at least one fuel cell stack comprises at least one fuel cell stack layer, each at least one fuel cell stack layer comprising at least one fuel cell, fuel and oxidant inlet/outlet connections, and flow paths for fuel and oxidant stream or streams, and for used fuel and oxidant stream or streams, a fuel cell stack base plate and fuel cell stack endplate. Preferably, each fuel cell stack additionally comprises fuel cell stack endplates, and fuel cell stack compression means. Preferably, each fuel cell stack additionally comprises stack interconnects. Preferably, the fuel cell stack interconnects are electrically conducting gas impermeable metal interconnect plates.

The fact that the reformer heat exchanger is a parallel-flow heat exchanger and is arranged for exchanging heat between the cathode and anode inlet gases prior to their entry into the at least one fuel cell means that the outlet temperature of the cathode and anode inlet gases from the reformer and the reformer heat exchanger, and hence inlet temperatures to the cathode and anode sides of the at least one fuel cell stack, are very close to one another.

The temperature difference between the anode and cathode inlet gases to the at least one fuel cell is primarily determined by the performance of the reformer heat exchanger. For example, in a steady-state operation, the temperature difference between the anode and cathode inlet gases to the at least one fuel cell stack may be within 20 Deg C., more typically within 15 Deg C. of one another.

This parallel-flow arrangement presents a number of significant advantages. In particular, it means that the thermal stress across the electrolyte layer of the at least one fuel cell is significantly reduced as compared to prior art fuel cell systems. By reducing thermal stress, the rate of degradation of electrolyte over time can be reduced.

As detailed above, carbon drop-out is a significant problem in fuel cells, particularly over their full lifecycle. It is highly desirable to reduce the amount of carbon drop-out, or at least to minimise the amount of carbon drop-out that occurs in the at least one fuel cell and in the piping between the reformer and the at least one fuel cell stack/at least one fuel cell. These components are typically difficult to access in the final product and as such are not generally suitable for convenient maintenance, particularly in a domestic product.

The proximity of the outlet temperature of the anode inlet gases from the reformer, and hence the inlet temperature to the anode side of the at least one fuel cell stack, means that the risk of carbon drop-out between the reformer and the at least one fuel cell stack is significantly reduced.

Where the IT-SOFC system is adapted for the outlet temperature of the anode inlet gas from the reformer to be close to the operational temperature of the at least one fuel cell stack, the risk of carbon drop-out in the at least one fuel cell stack is also further reduced.

Preferably, the IT-SOFC system additionally comprises an at least one oxidant heater located in said cathode inlet gas fluid flow path between said oxidant inlet and said reformer heat exchanger, an at least one oxidant blower, a fuel cell stack cathode inlet gas temperature sensor, a fuel cell stack cathode off-gas temperature sensor and control means, said control means adapted to control said oxidant blower and the heating of inlet oxidant by said oxidant heater to maintain said cathode inlet gas temperature sensor at or about a predetermined temperature, and said cathode off-gas temperature sensor at or about a predetermined temperature. In this context throughout the specification "maintain" includes the case where cathode inlet gas temperature sensor is not at or about the predetermined temperature before the control means controls said oxidant blower and the heating of inlet oxidant by said oxidant heater. Similarly, in this context throughout the specification "maintain" includes the case where cathode off-gas temperature sensor is not at or about the predetermined temperature before the control means controls said oxidant blower and the heating of inlet oxidant by said oxidant heater.

Preferably, the cathode inlet gas temperature sensor is maintained within 5, 10, 15, 20, 25, 30, 35, 40, 45 or 50 Deg C. of the predetermined temperature, most preferably within 5 Deg C. of the predetermined temperature.

Preferably, the cathode off-gas temperature sensor may be maintained within 5, 10, 15, 20, 25, 30, 35, 40, 45 or 50 Deg C. of the predetermined temperature, most preferably within 5 Deg C. of the predetermined temperature.

Preferably, the main cathode inlet gas flow path (also referred to as "an inlet oxidant main path") flows from an oxidant inlet to the reformer heat exchanger oxidant inlet.

Preferably, the air bypass inlet gas flow path (also referred to as "an inlet oxidant bypass") flows from an oxidant inlet to the reformer heat exchanger oxidant inlet.

Preferably, the secondary air bypass inlet gas flow path passes from an oxidant inlet to the reformer cathode off-gas fluid flow path, i.e. between the reformer heat exchanger oxidant outlet and fuel cell stack cathode inlet, more preferably between reformer heat exchanger oxidant outlet and the fuel cell stack cathode inlet gas temperature sensor.

Preferably, the IT-SOFC system additionally comprises an at least one oxidant heater located in said cathode inlet gas fluid flow path between said oxidant inlet and said reformer heat exchanger.

Preferably, the IT-SOFC system additionally comprises an inlet oxidant main path from said at least one oxidant inlet to said reformer heat exchanger to said at least one fuel cell stack cathode inlet, and an at least one inlet oxidant bypass from said at least one oxidant inlet to said at least one fuel cell stack cathode inlet, and/or from said at least one oxidant inlet to said reformer heat exchanger to said at least one fuel cell stack cathode inlet.

Preferably, said at least one oxidant heater is located in said inlet oxidant main path.

Thus, the at least one heat source does not need to be controlled (so long as it is capable of supplying the required amount of heat), and instead the flow of oxidant via a main path and a bypass is varied in order to achieve the required cathode inlet gas temperature.

According to this arrangement, the at least one oxidant heater is not located in the least one inlet oxidant bypass.

The at least one inlet oxidant bypass from said at least one oxidant inlet to said at least one fuel cell stack cathode inlet does not pass through the reformer heat exchanger. Such a bypass allows a degree of independent control of the temperature of the cathode inlet gas after it has left the reformer heat exchanger.

Preferably, said at least one inlet oxidant bypass comprises at least two inlet oxidant bypasses, one from said at least one oxidant inlet to said at least one fuel cell stack cathode inlet, and another from said at least one oxidant inlet to said reformer heat exchanger inlet to said at least one fuel cell stack cathode inlet.

Preferably, the IT-SOFC system additionally comprises an at least one oxidant blower, the at least one blower being located in said inlet oxidant main path and/or said at least one inlet oxidant bypass. The at least one blower may be a single blower. The single blower may be located in said inlet oxidant main path and said at least one inlet oxidant bypass.

The at least one blower may be two blowers. The two blowers may be located, respectively, in said inlet oxidant main path and said at least one inlet oxidant bypass. The at least one inlet oxidant bypass may be a single inlet oxidant bypass.

The at least one blower may be three blowers. The at least two inlet oxidant bypasses may be two inlet oxidant bypasses. The three blowers may be located, respectively, in said inlet oxidant main path and said two inlet oxidant bypasses.

Preferably, the IT-SOFC system additionally comprises at least one adjustable inlet oxidant flow splitter, to control inlet oxidant flow between said at least one inlet oxidant bypass and said inlet oxidant main path.

Preferably, the IT-SOFC system additionally comprises an adjustable inlet oxidant flow splitter, to control inlet oxidant flow between said one inlet oxidant bypass and said another inlet oxidant bypass. This allows the flow rate of oxidant to both the reformer heat exchanger and the at least one fuel cell stack cathode inlet to be controlled from a single source.

Preferably, a control means is provided which is adapted to control the at least one blower and/or the at least one adjustable inlet oxidant flow splitter, preferably to maintain said cathode inlet gas temperature sensor at or about a predetermined temperature, and said cathode off-gas temperature sensor at or about a predetermined temperature.

Preferably, an additional temperature sensor is provided. Said additional temperature sensor is preferably a fuel cell stack anode inlet gas temperature sensor. Other additional sensors may be provided. Preferably, the control means is adapted to control said at least one oxidant blower or said at least one adjustable inlet oxidant flow splitter to maintain said cathode inlet gas temperature sensor and/or said cathode off-gas temperature sensor and/or said fuel cell stack anode inlet gas temperature sensor at or about a predetermined temperature.

Preferably, an inlet oxidant bypass joins the cathode inlet gas flow path between the reformer heat exchanger and the cathode inlet, more preferably between the reformer heat exchanger oxidant outlet and the fuel cell stack cathode inlet gas temperature sensor. Preferably, an oxidant blower or an adjustable inlet oxidant flow splitter is located in said inlet oxidant bypass. Preferably, the control means is adapted to control said oxidant blower or said adjustable inlet oxidant flow splitter to maintain said cathode inlet gas temperature sensor and/or said cathode off-gas temperature sensor and/or said fuel cell stack anode inlet gas temperature sensor at or about a predetermined temperature.

Preferably, an inlet oxidant bypass joins the cathode inlet gas flow path between the oxidant inlet of the cathode inlet gas flow path and the reformer heat exchanger, more preferably between the at least one oxidant heater and the reformer heat exchanger. Preferably, an oxidant blower or an adjustable inlet oxidant flow splitter is located in said inlet oxidant bypass. Preferably, the control means is adapted to control said oxidant blower or said adjustable inlet oxidant flow splitter to maintain said cathode inlet gas temperature sensor and/or said cathode off-gas temperature sensor and/or said fuel cell stack anode inlet gas temperature sensor at or about a predetermined temperature.

The predetermined temperatures may be determined with reference to a table of preferred temperatures, for example with reference to a given power output, or a given rate of fuel flow. These predetermined temperatures can also be referred to as operational setpoints, or required operational setpoints. For a fuel cell stack with a 1 kW electrical power output, the predetermined temperature for the fuel cell stack cathode inlet gas temperature sensor may be about 540 Deg C. Preferably, the predetermined temperature for the fuel cell stack cathode inlet gas temperature sensor is in the range 530-570 Deg C. For a fuel cell stack with a 1 kW electrical power output, the predetermined temperature for the fuel cell stack cathode off-gas temperature sensor may be about 610 Deg C. Preferably, the predetermined temperature for the fuel cell stack cathode off-gas temperature sensor is in the range 580-620 Deg C.

Reference herein to fuel cell stack electrical power output is distinct from fuel cell system electrical power output, and does not include power consumed by the fuel cell system itself, e.g. for control means and blowers etc.

Preferably, the control means is adapted to maintain the cathode inlet gas temperature sensor and cathode off-gas temperature sensor at or about the predetermined temperatures when the fuel cell system is in a steady state operation.

More preferably, the control means is adapted to maintain the fuel cell stack cathode inlet gas temperature sensor at a temperature of about 520-600 Deg C., more preferably about 530-570 Deg C., more preferably about 540 Deg C. and the fuel cell stack cathode off-gas temperature at a temperature of about 550-650 Deg C., more preferably 580-620 Deg C., more preferably about 610 Deg C.

Preferably, the control means is adapted to maintain the fuel cell stack anode inlet gas temperature at a temperature of about 520-600 Deg C., more preferably about 530-570 Deg C. Preferably, the control means is adapted to maintain the fuel cell stack anode off-gas at a temperature of about 550-650 Deg C., more preferably about 580-620 Deg C.

Preferably, the control means is additionally configured to control fuel and water flow to the fuel cell system from the fuel source and a water supply.

Preferably, the control means is configured to control, more preferably to monitor and control, the electrical power delivered from the fuel cell system to an electrical load.

This temperature control at two discrete points in the oxidant flow path is conveniently achieved by a combination of:
(i) controlling heating of the cathode inlet gas, and
(ii) controlling the mass flow rate of the cathode inlet gas.

Thus, two independent control loops operate.

The first control loop is for the control of the cathode inlet gas temperature to the at least one fuel cell stack. The control means is adapted to increase heating of inlet oxidant by the at least one oxidant heater if the temperature of cathode inlet gas determined by the cathode inlet gas temperature sensor is below a predetermined temperature, and vice versa.

Thus, the temperature of cathode inlet gas to the at least one fuel cell stack is controlled.

This in turn means that the temperature of anode inlet gas to the at least one fuel cell stack is also maintained, and that it is maintained irrespective of variations in (and therefore heat demands exerted by) mass flow of inlet oxidant and fuel, and variations in inlet temperatures of oxidant and fuel to the IT-SOFC system.

The second control loop is for the control of the at least one fuel cell stack cathode off-gas temperature. Since the cathode inlet gas temperature to the at least one fuel cell stack is controlled separately, the cathode off-gas temperature is controlled by varying the oxidant mass flow rate through the at least one fuel cell stack.

Thus, the control means is adapted to increase the cathode inlet gas mass flow rate if the temperature of cathode off-gas determined by the fuel cell stack cathode off-gas temperature sensor is above a predetermined temperature, and vice versa.

This provides the significant advantage of a simple and convenient self-adjusting control system which maintains the fuel cell stack cathode inlet and output temperatures (and thus the ΔT across the fuel cell stack) within a controlled range.

Preferably, the IT-SOFC system additionally comprises:
an adjustable inlet oxidant flow splitter;
an inlet oxidant bypass; and
an inlet oxidant main path,
said control means configured to control said adjustable inlet oxidant flow splitter to control inlet oxidant flow between said inlet oxidant bypass and said inlet oxidant main path, said at least one oxidant heater located in said inlet oxidant main path.

Thus, the inlet oxidant bypass acts to bypass the at least one oxidant heater. In other embodiments, the an inlet oxidant bypass acts to bypass said reformer/reformer heat exchanger.

Thus, the at least one heat source does not need to be controlled (so long as it is capable of supplying the required amount of heat), and instead the flow of oxidant via a main path and a bypass is varied in order to achieve the required cathode inlet gas temperature.

Preferably, the adjustable inlet oxidant flow splitter, inlet oxidant bypass and inlet oxidant main path are located between the at least one oxidant blower and the reformer heat exchanger.

Other arrangements will be readily apparent to a person of ordinary skill in the art. For example, multiple oxidant inlets into the IT-SOFC system may be provided, e.g. a heated oxidant inlet and an unheated oxidant inlet, together with a valve and/or blower arrangement to control flow through or from such inlets.

Preferably, the IT-SOFC additionally comprises:
an inlet oxidant bypass from an oxidant inlet to said reformer heat exchanger, and a first blower, and
an inlet oxidant main path from an oxidant inlet to said reformer to said reformer, and a second blower,
said control means configured to control said first and second blowers to control inlet oxidant flow between said inlet oxidant bypass and said inlet oxidant main path, said at least one oxidant heater located in said inlet oxidant main path.

The reformer parallel-flow heat exchanger arrangement means that the reformate quality (i.e. the extent of reforming of the inlet fuel) is not significantly affected by fluid flow rates and (as a function of reformer temperature) is directly linked to the fuel cell stack cathode inlet (oxidant) temperature. The oxidant temperature to the fuel cell stack is controlled by varying the proportions of inlet oxidant entering via the inlet oxidant main path and the inlet oxidant bypass. Thus, the inlet oxidant passing to the at least one fuel cell stack cathode inlet can be maintained at a generally constant temperature as fuel cell stack degradation occurs.

As the fuel cell stack degrades, the flow rate of inlet oxidant to the reformer heat exchanger (and to the fuel cell stack) is increased to maintain the desired temperature or achieve the predetermined temperature at the fuel cell stack cathode inlet gas temperature sensor, and therefore the total stream enthalpy increases. However, the co-flow nature of the heat exchanger reformer means that the resulting increase in reformate outlet temperature is significantly less than if the inlet oxidant flow rate had not been increased and instead the temperature at the fuel cell stack cathode inlet gas temperature sensor had increased. Thus, reformate quality is maintained throughout the life of the system and the level of internal reforming does not decrease in the way that is experienced with prior art fuel cell stack arrangements.

The coupling in the present invention of the reformer temperature to the fuel cell stack cathode and anode inlet temperatures means that the temperature change for the anode inlet flow passing from the reformer (i.e. the reformate) to the fuel cell stack anode inlet is relatively small, in turn meaning that the risk of carbon drop-out is significantly reduced compared to prior art devices.

As the fuel cell stack degrades and the electrical efficiency decreases, the heat released by the fuel cell stack increases, requiring an increase in the cathode oxidant flow rate in order to maintain a fuel cell stack cathode off-gas temperature.

Thus, although increasing the oxidant inlet flow to the fuel cell stack results in an increased blower power consumption, the present invention means that the increase in oxidant inlet flow does not alter the reformate quality, in turn meaning that the amount of endothermic internal reforming at the fuel cell stack is maintained, in turn meaning that further additional fuel cell stack cooling is not required.

The parallel-flow arrangement of the reformer heat exchanger and resultant close coupling of the inlet temperatures to the cathode and anode sides of the fuel cell stack also reduces the thermal stresses through the (ceramic) fuel cell electrolyte layers, and thus increases fuel cell electrolyte operational life.

Preferably, the reformate flow from the reformer outlet is in direct fluid flow communication with the at least one fuel cell stack anode inlet. Preferably, the cathode outlet from the reformer heat exchanger is in direct fluid flow communication with the at least one fuel cell stack cathode inlet.

Preferably, the oxidant heater comprises at least one heat exchanger.

More preferably, the at least one oxidant heater comprising an oxidant pre-heater heat exchanger in fluid flow communication with at least one of said fuel cell stack anode off-gas outlet and fuel cell stack cathode off-gas outlet, and arranged for exchanging heat between (a) gas flow from said at least one of said fuel cell stack anode off-gas outlet and said fuel cell stack cathode off-gas outlet, and (b) said inlet oxidant.

Thus, the hot anode and/or cathode gas flow exiting the at least one fuel cell stack is used to heat the inlet oxidant flow to the reformer heat exchanger.

More preferably still, the fuel cell system additionally comprises a tail-gas burner in fluid flow communication with said at least one fuel cell stack anode and cathode off-gas outlets, having a tail-gas burner exhaust, defining a fluid flow path from said at least one fuel cell stack anode and cathode off-gas outlets to said tail-gas burner exhaust to said oxidant pre-heater heat exchanger, to said fuel cell system exhaust.

Thus, fuel remaining in the at least one fuel cell stack anode off-gas is burnt and the heat generated is used to heat inlet oxidant. A minimum tail gas burner exhaust temperature is required to comply with gaseous emissions requirements. Should the tail gas burner exhaust temperature drop below this minimum value additional unreformed fuel is supplied directly to the tail gas burner from the fuel source to increase the tail gas burner exhaust temperature.

Preferably, the tail-gas burner additionally comprises a tail-gas burner fuel inlet. Preferably, the fuel cell system additionally comprises a tail-gas burner exhaust temperature sensor, the control means being configured to provide additional fuel to the tail-gas burner via the tail-gas burner fuel inlet when the temperature detected by the tail-gas burner exhaust temperature sensor is below a predetermined temperature. Preferably, the tail-gas burner fuel inlet is adapted for the provision of unreformed fuel to the tail-gas burner, i.e. is directly connected to (is in direct fluid flow communication with) a fuel source, more preferably an unreformed fuel source.

Preferably, the oxidant heater comprises an anode off-gas heat exchanger in fluid flow communication with said at least one fuel cell stack anode off-gas outlet, and arranged for exchanging heat between (a) gas flow from said anode off-gas outlet, and (b) said inlet oxidant.

Preferably, the IT-SOFC system additionally comprises a condenser heat exchanger located in the anode off-gas fluid flow path between said anode off-gas heat exchanger and said tail-gas burner, wherein said condenser heat exchanger is arranged for exchanging heat between said anode off-gas and a cooling fluid. More preferably, the condenser heat exchanger is adapted to cause the temperature of the anode off-gas to be below the condensation point of water.

Preferably, the cooling fluid is part of a cooling fluid system. Preferably, the cooling fluid system is part of a combined heat and power (CHP) unit, where the cooling system is controllably used to convey heat from the anode off-gas for use by the CHP unit, such as for heating hot water or a thermal store. Other cooling fluid systems will be readily apparent to one of ordinary skill in the art. Examples include a radiator system, where the thermal energy from the anode off-gas is transferred via the cooling fluid to a radiator which in turn transfers the thermal energy to another fluid, thus cooling the cooling fluid.

Preferably, the cooling fluid is used to remove sufficient thermal energy from the anode off-gas so as to reduce the temperature of the anode off-gas to a level below the condensation point of water, thus allowing water to be condensed from the anode off-gas.

More preferably, the IT-SOFC system additionally comprises a separator located in the anode off-gas fluid flow path between said condenser heat exchanger and said tail-gas burner, wherein said separator is arranged to separate condensate from said anode off-gas. More preferably still, the separator additionally comprises a separator condensate outlet, and is arranged to exhaust said condensate via said condensate outlet.

The condensate will be water, and thus the separator can be used as the water supply to a steam generator and/or a steam reformer.

Preferably, the IT-SOFC system comprises both an oxidant pre-heater heat exchanger and an anode off-gas heat exchanger, and a cathode inlet gas fluid flow path passes from said oxidant inlet to said anode off-gas heat exchanger to said oxidant pre-heater heat exchanger to said reformer heat exchanger. As noted above, in certain embodiments there are multiple inlet oxidant flow paths, particularly an inlet oxidant main flow path and an inlet oxidant bypass flow path. In such cases, the cathode inlet gas fluid flow path which passes from said oxidant inlet to said anode off-gas heat exchanger to said oxidant pre-heater heat exchanger to said reformer heat exchanger is the inlet oxidant main flow path.

With the systems of the present invention, the fuel cell stack inlet and outlet temperatures are controlled.

Preferably, the IT-SOFC system additionally comprises:
an evaporator having a fuel inlet in fluid flow communication with said fuel source, a water inlet in fluid flow communication with a water source, and an evaporator exhaust, the evaporator located in the anode inlet gas fluid flow path between said fuel source and said steam reformer, and an evaporator heat exchanger located in the fluid flow path between (a) at least one of said anode off-gas outlet and cathode off-gas outlet, and (b) said fuel cell system exhaust, wherein:

said evaporator heat exchanger is arranged for exchanging heat between (a) gas flow from said at least one of said anode off-gas outlet and said cathode off-gas outlet, and (b) at least one of said anode inlet gas and said water.

Preferably, the condensate (water) from a separator is used as the water source for the evaporator and/or the steam reformer.

Also provided according to the present invention is a method of operating an intermediate-temperature solid oxide fuel cell system according to the present invention, the method comprising the steps of:

(i) passing fuel from a fuel source to said steam reformer;

(ii) passing heated inlet oxidant from said oxidant inlet to said reformer heat exchanger such that heat is exchanged between said heated inlet oxidant and said fuel;

(iii) passing anode inlet gas from said steam reformer to said at least one fuel cell stack anode inlet, and passing inlet oxidant from said reformer heat exchanger to said at least one fuel cell stack cathode inlet; and (iv) operating the at least intermediate-temperature solid oxide fuel cell stack.

In a second aspect of the present invention there is provided an intermediate-temperature solid oxide fuel cell (IT-SOFC) system comprising:

(i) at least one fuel cell stack comprising at least one intermediate-temperature solid oxide fuel cell, and having an anode inlet, a cathode inlet, an anode off-gas outlet, a cathode off-gas outlet, and defining separate flow paths for flow of anode inlet gas, cathode inlet gas, anode off-gas and cathode off-gas; and (ii) a steam reformer for reforming a hydrocarbon fuel to a reformate, and having a reformer inlet for anode inlet gas, a reformer outlet for exhausting anode inlet gas, and a reformer heat exchanger;

and defining:

(a) an anode inlet gas fluid flow path from a fuel source to said steam reformer to said at least one fuel cell stack anode inlet;

(b) an anode off-gas fluid flow path from said at least one fuel cell stack anode off-gas outlet to a fuel cell system exhaust;

(c) a cathode inlet gas fluid flow path from an at least one oxidant inlet to said reformer heat exchanger to said at least one fuel cell stack cathode inlet; and (d) a cathode off-gas fluid flow path from said at least one fuel cell stack cathode off-gas outlet to said fuel cell system exhaust;

wherein said reformer heat exchanger is a parallel-flow heat exchanger in fluid flow communication with (i) said at least one oxidant inlet and said at least one fuel cell stack cathode inlet, and (ii) said fuel source and said at least one fuel cell stack anode inlet, and is arranged for exchanging heat between said cathode inlet gas and said anode inlet gas, said system additionally comprising:

an at least one inlet oxidant bypass from said at least one oxidant inlet to said at least one fuel cell stack cathode inlet;

an inlet oxidant main path from said at least one oxidant inlet to said reformer heat exchanger to said at least one fuel cell stack cathode inlet; and an adjustable inlet oxidant flow splitter located in said at least one inlet oxidant bypass and said inlet oxidant main path, to control inlet oxidant flow between said at least one inlet oxidant bypass and said inlet oxidant main path.

The arrangement of the second aspect allows the flow rate of oxidant to both the reformer heat exchanger and the fuel cell stack cathode inlet to be controlled from a single source.

All preferable features of the first aspect of the present invention are equally applicable to the second aspect of the present invention.

According to the present invention, each blower and/or valve/separator may be in communication with and driven/controlled by or in response to control means.

According to the present invention, one or more blowers or valves/separators may be provided in one or more of main cathode inlet gas flow path, air bypass inlet gas flow path and air bypass inlet gas flow path. For example, if a single blower is provided, then zero, one or two valve/separators may be provided, or if two blowers are provided, then a zero or a single valve/separator may be provided, or if three blowers are provided, then zero valve/separators may be provided.

The above features discussed with regard to the IT-SOFC system apply equally to the method, unless stated otherwise.

The term "tail-gas burner" as used herein means a burner for burning anode and cathode off-gases. Tail-gas burners also typically mix the anode and cathode off-gases, although that may be done separately in some circumstances.

The term "fluid flow path" is used to define fluid flow paths between various components, and thus it is also to be understood that those components are in fluid flow communication with one another.

Unless the context dictates otherwise, the term "fluid" incorporates both liquids and gases.

Unless the context dictates otherwise, the term "operating temperature" means a steady-state operating temperature, i.e. does not include start-up and shut-down temperatures.

Unless indicated otherwise, all temperature values are given in degrees Celsius (DegC).

Reference herein to a heat exchanger (and heat exchangers) arranged to exchange heat between first and second heat exchange fluids (e.g. between an anode inlet gas and a cathode inlet gas) is also reference to the heat exchanger being arranged to exchange heat between first and second sides of the heat exchanger and between corresponding fluid flow paths, e.g. between first and second sides of a heat exchange material or heat exchange surface, e.g. between an anode inlet side and a cathode inlet side of the heat exchanger, e.g. between an anode inlet fluid flow path and a cathode inlet fluid flow path and such terms are interchangeable unless the context dictates otherwise.

A list of the reference signs used herein is given at the end of the specific embodiments.

For illustrative purposes only, the figures only indicate a single fuel cell. In various embodiments, multiple fuel cells are provided. In further embodiments (not shown) multiple fuel cell stacks are provided, and in still further embodiments multiple fuel cell stacks each comprising multiple fuel cells are provided. It will be appreciated that the anode and cathode inlets, outlets (off-gas), ducting, manifolding, and temperature sensors and their configuration are modified as appropriate for such embodiments, and will be readily apparent to a person of ordinary skill in the art.

In the following embodiments, air is used as the oxidant. Any reference to "oxidant" elsewhere can therefore be construed as reference to "air" in the following embodiments, and vice versa.

Figure 1:
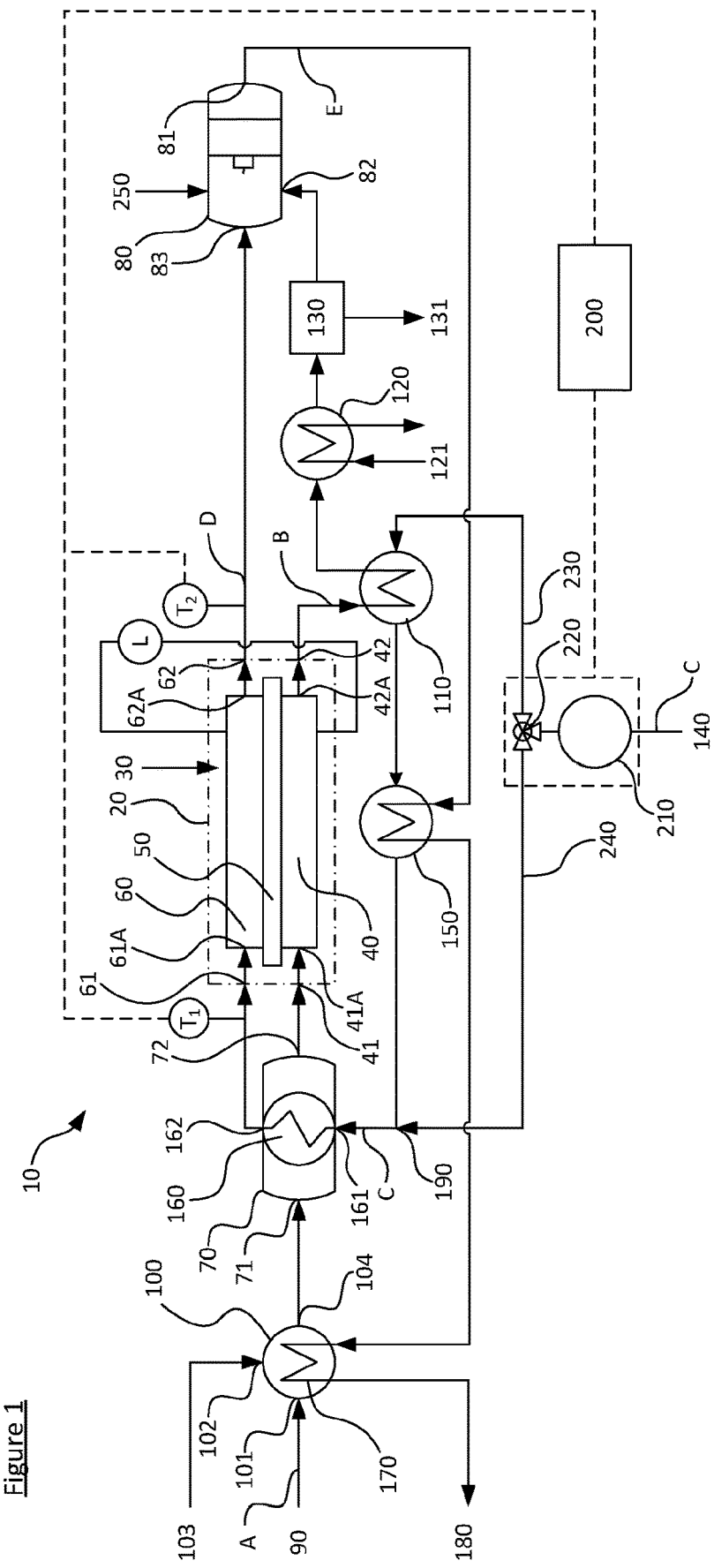
FIG. 1 shows a schematic of a fuel cell system according to the present invention.

Referring to FIG. 1, fuel cell system 10 is an intermediate-temperature solid oxide fuel cell (IT-SOFC) system. Fuel cell stack 20 is a metal-supported IT-SOFC fuel cell stack, as taught in U.S. Pat. No. 6,794,075. Fuel cell system 10 has a steady state 1 kW electric output from fuel cell stack 20, and comprises 121 metal-supported IT-SOFC fuel cells 30. Each fuel cell 30 has an anode side 40, electrolyte layer 50, and cathode side 60. Each fuel cell layer in the fuel cell stack is separated by an electrically conducting gas impermeable metal interconnect plate (interconnector) (not shown). Fuel cell stack endplates and compression means (not shown) are also provided.

Reference herein to fuel cell 30 is to the full set of 121 fuel cells 30.

Electrical load L is placed across fuel cell 30.

Fuel cell stack anode inlet 41 is in fluid flow communication with fuel cell anode inlet 41A for the flow of anode inlet gas to the anode side 40 of fuel cell 30. Fuel cell anode outlet 42A is in fluid flow communication with fuel cell stack anode off-gas outlet 42 for the flow of anode off-gas.

Fuel cell stack cathode inlet 61 is in fluid flow communication with fuel cell cathode inlet 61A for the flow of cathode inlet gas to the cathode side 60 of fuel cell 30. Fuel cell cathode outlet 62A is in fluid flow communication with fuel cell stack cathode off-gas outlet 62 for the flow of cathode off-gas.

Steam reformer 70 comprises reformer inlet 71 for anode inlet gas and reformer outlet 72 for exhausting anode inlet gas.

Tail-gas burner 80 is in fluid flow communication with fuel cell stack anode and cathode off-gas outlets 42, 62 and has a tail gas burner exhaust 81, anode off-gas inlet 82 and cathode off-gas inlet 83. Tail-gas burner 80 defines a fluid flow path from fuel cell stack anode and cathode off-gas outlets 42, 62 to tail-gas burner exhaust 81, and is configured for burning anode and cathode off-gases and producing a tail-gas burner off-gas.

An anode inlet gas fluid flow path A is defined from fuel source 90 to evaporator 100 to steam reformer 70 to fuel cell stack anode inlet 41 to fuel cell anode inlet 41A, i.e. the components are in fluid flow communication with one another.

An anode off-gas fluid flow path B is defined from fuel cell anode outlet 42A to fuel cell stack anode off-gas outlet 42 to anode off-gas heat exchanger 110 (HX-AOG) to condenser heat exchanger 120 to separator 130 to anode off-gas inlet 82 of tail-gas burner 80.

Main cathode inlet gas flow path 230 and air bypass inlet gas flow path 240 have a number of common components and share a common flow path in a number of places, marked as cathode inlet gas fluid flow path C and detailed below.

Main cathode inlet gas flow path 230 is defined from oxidant inlet 140 to blower 210 to valve/separator 220 to anode off-gas heat exchanger 110 to air pre-heater heat exchanger 150 (HX-APH) to reformer heat exchanger 160 (HX-Ref) to fuel cell stack cathode inlet 61 to fuel cell cathode inlet 61A.

Air bypass inlet gas flow path 240 is defined from oxidant inlet 140 to blower 210 to valve/separator 220 to air bypass inlet 190 to reformer heat exchanger 160 to fuel cell stack cathode inlet 61 to fuel cell cathode inlet 61A.

As detailed below, valve/separator 220 is controlled by control means 200 so as to split the flow of inlet air between main cathode inlet gas flow path 230 and air bypass inlet gas flow path 240.

Thus, the air bypass inlet gas flow path 240 bypasses anode off-gas heat exchanger 110 and air pre-heater heat exchanger 150.

In this embodiment, the common parts of gas flow paths 230 and 240 (cathode inlet gas fluid flow path C) are therefore (a) oxidant inlet 140 to blower 210 to valve/separator 220, and (b) reformer heat exchanger 160 to fuel cell stack cathode inlet 61 to fuel cell cathode inlet 61A.

A cathode off-gas fluid flow path D is defined from fuel cell cathode outlet 62A to fuel cell stack cathode off-gas outlet 62 to cathode off-gas inlet 83 of tail-gas burner 80.

A tail-gas burner off-gas fluid flow path E is defined from tail gas burner exhaust 81 to air pre-heater heat exchanger 150 to evaporator heat exchanger 170 (HX-Evap) to fuel cell system exhaust 180.

Anode off-gas heat exchanger 110 is in fluid flow communication with (i) fuel cell stack anode off-gas outlet 42 (i.e. with fuel cell anode outlet 42A) and tail-gas burner anode off-gas inlet 82, and (ii) oxidant inlet 140 and fuel cell stack cathode inlet 61 (i.e. with fuel cell cathode inlet 61A), and is arranged for exchanging heat between anode off-gas from fuel cell stack 20 and cathode inlet gas to fuel cell stack 20.

Air pre-heater heat exchanger 150 is in fluid flow communication with (i) tail-gas burner exhaust 81 and fuel cell system exhaust 180, and (ii) oxidant inlet 140 and fuel cell stack cathode inlet 61 (i.e. with fuel cell cathode inlet 61A), and is arranged for exchanging heat between tail-gas burner 81 off-gas and cathode inlet gas to fuel cell stack 20.

Reformer heat exchanger 160 is a parallel-flow heat exchanger and is in fluid flow communication with (i) oxidant inlet 140 and fuel cell stack cathode inlet 61 (i.e. with fuel cell cathode inlet 61A), and (ii) fuel source 90 and fuel cell stack anode inlet 41 (i.e. with fuel cell anode inlet 41A), and is arranged for exchanging heat between cathode inlet gas and anode inlet gas.

Evaporator 100 has a fuel inlet 101 for anode inlet gas from fuel source 90, a water inlet 102 for water from water supply 103, and an evaporator exhaust 104 for exhausting anode inlet gas from evaporator 100, and is located in the anode inlet gas fluid flow path between fuel source 90 and steam reformer 70. Evaporator 100 additionally comprises evaporator heat exchanger 170 located in the tail-gas burner off-gas fluid flow path E between air pre-heater heat exchanger 150 and fuel cell system exhaust 180.

Evaporator heat exchanger 170 is in fluid flow communication with (i) tail-gas burner exhaust 81 and fuel cell system exhaust 180, and (ii) fuel source 90 and water supply 103 and fuel cell stack anode inlet 41 (i.e. with fuel cell anode inlet 41A), and is arranged to exchange heat between tail-gas burner off-gas and anode inlet gas and water, generating a steam fuel mix for the anode inlet gas to steam reformer 70.

Condenser heat exchanger 120 is in fluid flow communication with (i) fuel cell stack anode off-gas outlet 42 (i.e. with fuel cell anode outlet 42A) and tail-gas burner anode off-gas inlet 82, and (ii) cooling circuit 121, and is arranged for exchanging heat between anode off-gas from fuel cell stack 20 and a cooling fluid in cooling circuit 121.

Separator 130 is located in the anode off-gas fluid flow path between condenser heat exchanger 120 and tail-gas burner 80, and has a separator condensate outlet 131, and is adapted to separate condensate from the anode off-gas fluid flow path, and exhaust the condensate via the condensate outlet 131.

Control means 200 is connected to fuel cell stack cathode inlet gas temperature sensor T1, fuel cell stack cathode off-gas temperature sensor T2, blower 210 and valve/separator 220. Control means 200 is configured to maintain the temperature determined by temperature sensors T1 and T2 at or about a desired temperature during steady-state operation of the fuel cell system.

Control means 200 is adapted to operate two independent control loops which operate upon the cathode inlet gas passing through the cathode inlet gas fluid flow path C.

In the first control loop, the heating of cathode inlet gas is controlled. In the second control loop, the mass flow rate of cathode inlet gas is controlled.

For the first control loop, control means 200 controls valve/separator 220 so as to vary the split of inlet oxidant flow between fluid flow paths 230 and 240. Thus, control means 200 is configured so that if the temperature determined by fuel cell stack cathode inlet gas temperature sensor T1 is below 542 Deg C. for a fuel cell stack electrical power output of 1 kW, it adjusts valve/separator 220 to increase the proportion of inlet oxidant passing along main cathode inlet gas fluid flow path 230 to anode off-gas heat exchanger 110 and air pre-heater heat exchanger 150. Thus, the proportion of inlet oxidant passing along air bypass inlet gas flow path 240 is correspondingly reduced, and the heating of inlet oxidant is increased.

Conversely, if the temperature determined by fuel cell stack cathode inlet gas temperature sensor T1 is above 542 Deg C. for a fuel cell stack electrical power output of 1 kW, control means 200 adjusts valve/separator 220 to decrease the proportion of inlet oxidant passing along main cathode inlet gas fluid flow path 230 to anode off-gas heat exchanger 110 and air pre-heater heat exchanger 150. Thus, the proportion of inlet oxidant passing along air bypass inlet gas flow path 240 is correspondingly increased, and the heating of inlet oxidant is decreased.

Thus, the temperature of cathode inlet gas to the at least one fuel cell stack (as determined by fuel cell stack cathode inlet gas temperature sensor T1) is controlled.

Thus, the temperature of oxidant exiting reformer heat exchanger 160 at reformer heat exchanger oxidant outlet 162 is also controlled. Since reformer heat exchanger 160 is a parallel-flow heat exchanger, this means that the temperature of reformate (anode inlet gas) exiting steam reformer 70 at reformer outlet 72 is also controlled, in turn meaning that the quality of reformate (i.e. the extent of reformation of inlet fuel) is controlled. As detailed below, the second control loop will cause a minor variation in the temperature of fuel exiting steam reformer 70 at reformer outlet 72, but this does not have a significant effect upon the quality of reformate and performance of fuel cell stack 20. Importantly, the parallel-flow nature of reformer heat exchanger 160 means that the temperature of fuel exiting steam reformer 70 can never be greater than the temperature of oxidant exiting steam reformer 70.

Thus, the temperature of anode inlet gas (i.e. quality of reformate) to the at least one fuel cell stack is controlled, and this control is irrespective of variations in (and therefore heat demands exerted by) mass flow of inlet oxidant and fuel, and variations in inlet temperatures of oxidant and fuel to the fuel cell system 10.

For the second control loop, control means 200 controls the mass flow rate of inlet oxidant driven by blower 200. Since the temperature determined by fuel cell stack cathode inlet gas temperature sensor T1 (and therefore the temperature at fuel cell stack cathode inlet 61) is controlled, cooling of fuel cell stack 20 is achieved by controlling the mass flow rate of oxidant across fuel cell stack 20.

Control means 200 is therefore configured so that if the temperature determined by fuel cell stack cathode off-gas temperature sensor T2 is above 610 Deg C. for a fuel cell stack electrical power output of 1 kW, it adjusts blower 210 to increase the mass flow rate of inlet oxidant. Thus, the mass flow rate of inlet oxidant across the cathode side 60 of fuel cell 30 is increased and the amount of cooling is correspondingly increased.

Conversely, if the temperature determined by fuel cell stack cathode off-gas temperature sensor T2 is below 610 Deg C. for a fuel cell stack electrical power output of 1 kW, control means 200 adjusts blower 210 to decrease the mass flow rate of inlet oxidant. Thus, the mass flow rate of inlet oxidant across the cathode side 60 of fuel cell 30 is decreased and the amount of cooling is correspondingly decreased.

Thus, the control means 200 is adapted to increase the cathode inlet gas mass flow rate if the temperature of cathode off-gas determined by the fuel cell stack cathode off-gas temperature sensor T2 is below a predetermined temperature, and vice versa.

In use, fuel cell system 10 goes through three phases: start-up, steady state, and shutdown.

Start-Up:

At this stage of operation, fuel cell stack 20 is cold (or at least below its steady-state operational temperature), and therefore must be heated in order to achieve an operational state.

Starting from cold (e.g. ambient temperature), blower 210 is operated to blow air across the cathode side of fuel cell stack 20, and fuel is passed directly to tail-gas burner 80 from fuel source 250 and is burnt with the airflow from blower 210. Exhaust gas exits tail-gas burner exhaust 81 and passes across air pre-heater heat exchanger 150 where it heats inlet air, in turn effecting heating of reformer heat exchanger 160 and the cathode side 60 of fuel cell stack 20. Heat is conducted across fuel cell 30 such that the anode side 40 of fuel cell 20 is also heated. Since fuel cell stack cathode inlet gas temperature sensor T1 is detecting a low temperature, valve/separator 220 is adjusted such that all inlet air is passed through main cathode inlet gas flow path 230 and thus across air pre-heater heat exchanger 150.

As the temperature detected by fuel cell stack cathode inlet gas temperature sensor T1 increases to a temperature greater than 300 Deg C., fuel is also supplied from fuel source 90. Fuel from fuel source 90 passes through evaporator 100, mixing with steam generated within evaporator 100 from water source 103. As the resultant fuel steam mixture passes along anode inlet gas fluid flow path A, it is further heated by reformer heat exchanger 160 and partially reformed by reformer 70, and passes to fuel cell stack anode inlet 41 and across the anode side 40 of fuel cell 30, acting to protect it from adverse oxidation events. It then exits at fuel cell stack anode outlet 42 and passes along anode off-gas fluid flow path B to tail-gas burner 80 where it is combusted.

This continues, with reforming of fuel from fuel source 90 starting to occur and fuel cell stack 20 reaching a temperature at which electricity is generated.

As fuel cell stack cathode off-gas temperature sensor T2 detects an increasing temperature, the amount of fuel supplied to tail-gas burner 80 from fuel source 250 is decreased until fuel cell stack 20 has reached a temperature at which it is self-sustaining, and the supply of fuel to tail-gas burner 80 from fuel source 250 is stopped.

Operation of fuel cell stack 20 continues, electrical power output from fuel cell stack 20 increases, and temperatures detected by temperature sensors T1 and T2 increase, with the corresponding control loops varying the inlet air mass flow rate and the splitting of air between flow paths 230 and 240.

A "steady state" is reached when both temperature sensors T1 and T2 have reached their operational set-points for the given fuel cell stack electrical power output. In the case of a 1 kW fuel cell stack electrical power output, this is a temperature of 542 DegC for temperature sensor T1, and a temperature of 610 Deg C. for temperature sensor T2.

Steady State:

At this stage of operation, fuel cell stack 20 is maintained at operational temperature, as determined by the sensors T1 and T2. Electricity is generated and used by load L across fuel cell 30. Temperatures detected by temperature sensors T1 and T2 will vary, and control means 200 varies the inlet air mass flow rate and the splitting of air between flow paths 230 and 240 accordingly.

In this mode of operation the electrical power generated by the fuel cell stack 20 can vary between zero and fuel cell stack rated power. The amount of electrical power generated is controlled by control means 200 responding to electrical load L up to the fuel cell stack rated power.

Shutdown:

At this stage of operation, electrical power is no longer required from fuel cell system 10, and a controlled shutdown sequence is initiated. Power demand from fuel cell stack 20 is reduced to zero and the temperature set point for fuel cell stack air inlet T1 is reduced, while the air flow rate from the blower 210 is increased. A small amount of fuel continues to be fed from fuel source 90 to reformer 70 and hence into fuel cell stack 20 and tail-gas burner 80. The continued flow of reformate maintains a reducing atmosphere over the anode side 40 of fuel cell 30 during this first phase of shutdown. Once the temperature determined by fuel cell stack cathode off-gas temperature sensor T2 (and therefore of fuel cell stack 20) is below the anode oxidation activation temperature (around 450 DegC), the fuel feed from fuel source 90 to steam reformer 70 is stopped. The flow of air from blower 210 is also stopped, and fuel cell system 10, and hence fuel cell stack 20, is left to naturally cool down.

Data from start-up and steady state operation of a fuel cell system 10 according to the present invention consisting a single fuel cell stack having 121 fuel cells is shown in Table 1 (below) and in FIG. 2. The data shown in the table is for an operational period of 30110 seconds, i.e. in excess of 8 hours.

Figure 2:
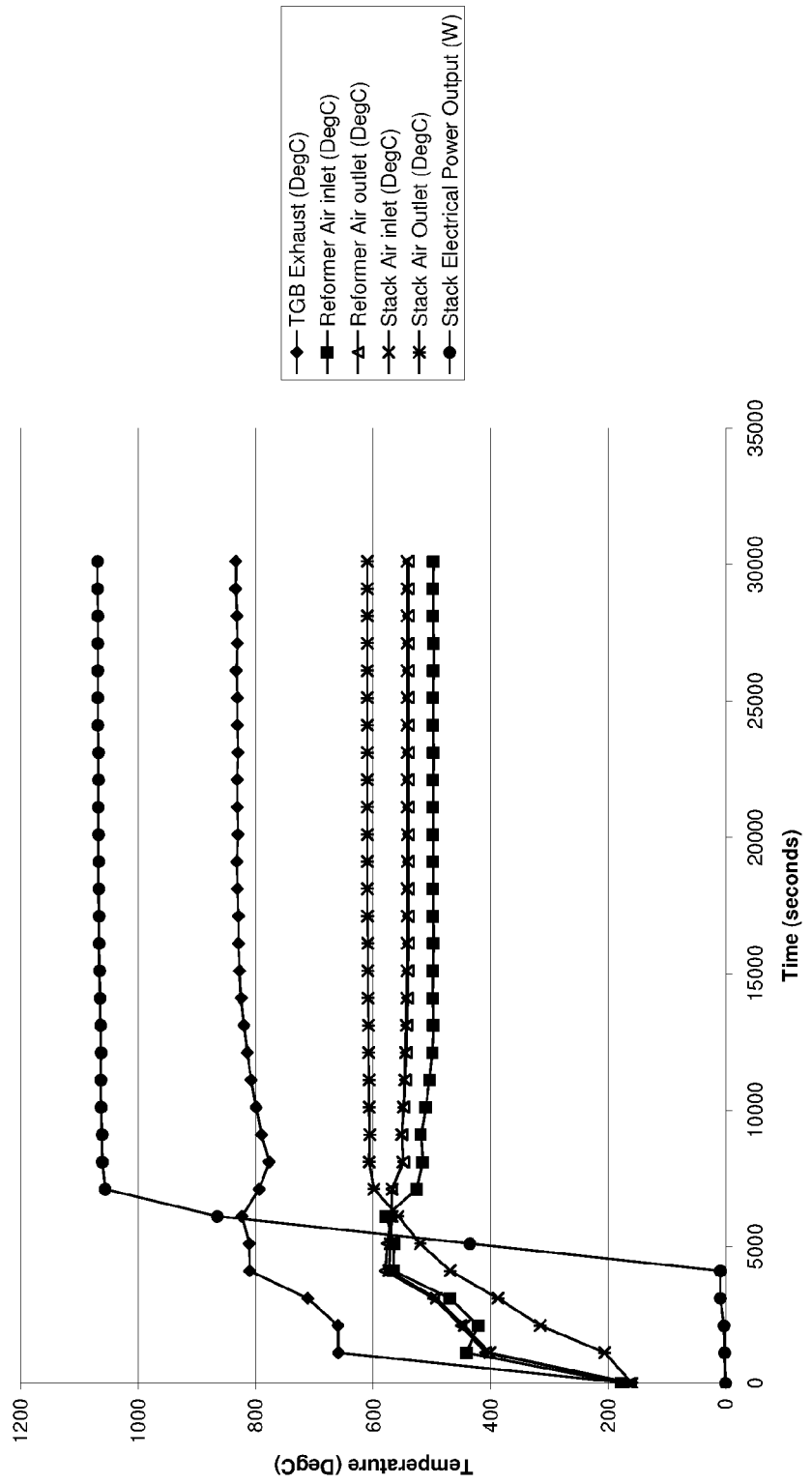
FIG. 2 is a scatter chart plot of the data shown in Table 1, with the first and every fifth data point (i.e. 0, 1110, 2110, 3110, 4110 seconds etc.) shown.

In Table 1 and FIG. 2, abbreviations have the following meanings:

TGB Exhaust (DegC)—temperature at tail-gas burner exhaust 81

Reformer Air inlet (DegC)—temperature at reformer heat exchanger oxidant inlet 161

Reformer Air outlet (DegC)—temperature at reformer heat exchanger oxidant outlet 162

Stack Air inlet (DegC)—temperature at fuel cell stack oxidant inlet 61, as detected by temperature sensor T1

Stack Air Outlet (DegC)—temperature at fuel cell stack oxidant outlet 62, as detected by temperature sensor T2

Figure 3:
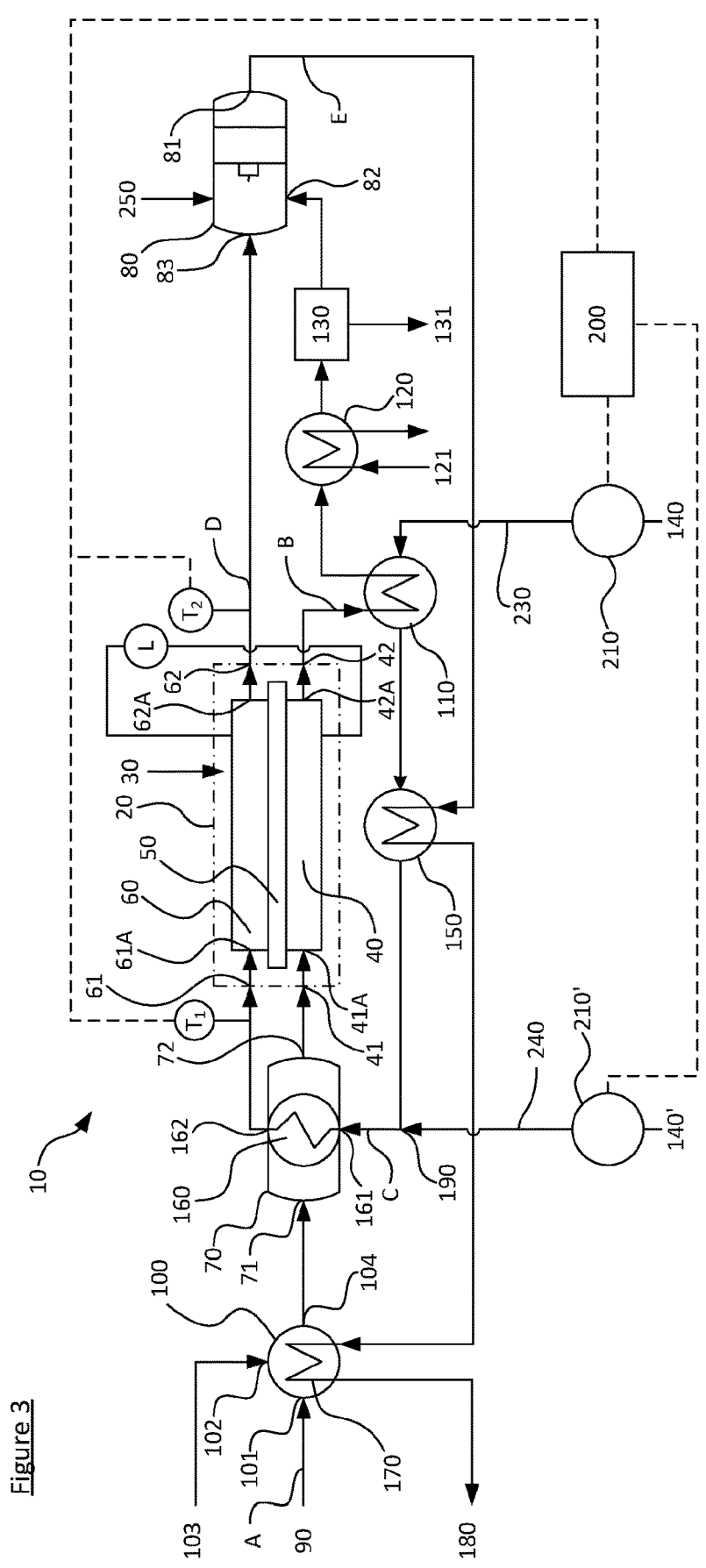
FIG. 3 shows a schematic of an alternative fuel cell system according to the present invention.

Stack Electrical Power Output (W)—electrical power output as determined across electrical circuit with load L In a second embodiment, as shown in FIG. 3, valve/separator 220 and the common portion of cathode inlet gas flow path C prior to it are dispensed with.

Main cathode inlet gas flow path 230 is defined from oxidant inlet 140 to blower 210 to anode off-gas heat exchanger 110 to air pre-heater heat exchanger 150 to reformer heat exchanger 160 to fuel cell stack cathode inlet 61 to fuel cell cathode inlet 61A.

Air bypass inlet gas flow path 240 is defined from oxidant inlet 140' to blower 210' to air bypass inlet 190 to reformer heat exchanger 160 to fuel cell stack cathode inlet 61 to fuel cell cathode inlet 61A.

Control means 200 is connected to fuel cell stack cathode inlet gas temperature sensor T1, fuel cell stack cathode off-gas temperature sensor T2, and blowers 210 and 210'. Control means 200 is configured to maintain the temperature determined by temperature sensors T1 and T2 at or about a desired temperature during steady-state operation of the fuel cell system.

As with the previous embodiment, in the first control loop, the heating of cathode inlet gas is controlled. In the second control loop, the mass flow rate of cathode inlet gas is controlled. The heating of cathode inlet gas is controlled by varying the ratio of cathode inlet gas mass flow between the main cathode inlet gas flow path 230 and the air bypass inlet gas flow path 240. This is achieved by varying the relative speeds of, and hence mass flow delivered from, blowers 210 and 210'. If the temperature of cathode inlet gas measured at temperature sensor T1 is too low, the ratio of cathode inlet gas flow through air bypass inlet gas flow path 240 to cathode inlet gas flow through main cathode inlet gas flow path 230 is reduced, and vice versa.

In the second control loop, the mass flow rate of cathode inlet gas is controlled. The mass flow rate of cathode inlet gas in the fuel cell stack is the total cathode inlet gas mass flow rate from blowers 210 and 210'. If the temperature of the fuel cell stack cathode off-gas as measured at temperature sensor T2 is too high, the total mass flow of cathode inlet gas delivered by blowers 210 and 210' is increased, and vice versa.

Figure 4:
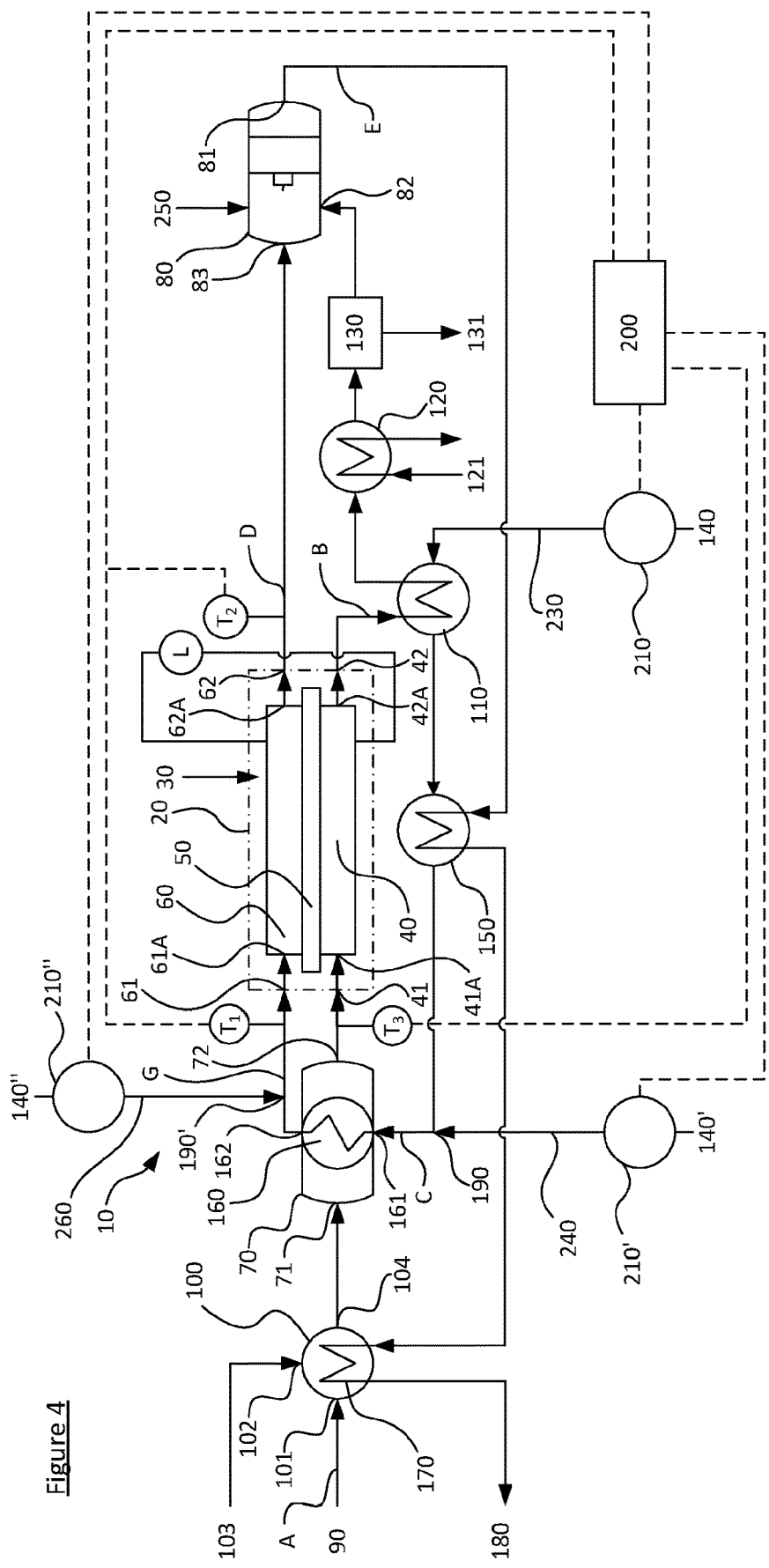
FIG. 4 shows a schematic of an alternative fuel cell system according to the present invention.

The third embodiment, as shown in FIG. 4, is similar to the second embodiment and only differences will be described. An additional oxidant inlet 140" and blower 210" are provided to provide an additional air bypass inlet gas flow path 260. An additional temperature sensor T3 is provided, which is a fuel cell stack anode inlet gas temperature sensor T3. These additional features provide an additional air inlet into the cathode inlet gas fluid flow path (C).

Air bypass inlet gas flow path 260 is defined from oxidant inlet 140" to blower 210" to air bypass inlet 190' to fuel cell stack cathode inlet 61 to fuel cell cathode inlet 61A. Thus the air bypass inlet gas flow path 260 meets the cathode inlet gas fluid flow path (C) at air bypass inlet 190' which is between the reformer heat exchanger 160 (and downstream of it) and the fuel cell stack cathode inlet 61, more particularly between the reformer heat exchanger oxidant outlet 162 and the fuel cell stack cathode inlet gas temperature sensor T1.

In this embodiment control means 200 is additionally connected to fuel cell stack anode inlet gas temperature sensor T3 and blower 210". Control means 200 is configured to maintain the temperature determined by temperature sensors T1, T2 and T3 at or about a desired temperature during steady-state operation of the fuel cell system.

The air flow rate through the additional air bypass inlet gas flow path 260 is controlled independently of the air flow rates in both the main cathode inlet gas flow path 230 and air bypass inlet gas flow path 240.

The additional advantage of this embodiment is that it provides a degree of independent control of the reformate outlet stream temperature from the reformer heat exchanger 160. The temperature control on the reformer outlet 72 provides the ability to increase the temperature of the anode inlet gas fluid flow path A relative to the temperature of the fuel cell cathode inlet 61A. As the air bypass inlet gas flow path 260 provides air that is colder than the air leaving the reformer heat exchanger 160, the air provided by the air bypass inlet gas flow path 260 can cool, but cannot warm, the air leaving the reformer heat exchanger 160. Hence, the additional air bypass inlet gas flow path 260 providing cold air according to this embodiment enables the anode inlet temperature to be higher than the cathode inlet temperature, but does not enable the anode inlet temperature to be lower than the cathode inlet temperature.

Increasing the temperature of the anode inlet gas at the reformer outlet 72 also increases the equilibrium temperature of the reforming reaction reached within the reformer heat exchanger 160 and hence increases the concentration of hydrogen within the anode inlet gas at the fuel cell stack anode inlet 41. Increased hydrogen concentration within the anode inlet gas will reduce the stress on the fuel cell 30 and reduce the amount of internal reforming required by the fuel cell 30.

An additional temperature sensor T3 is provided (which is a fuel cell stack anode inlet gas temperature sensor T3) to measure the temperature of the anode gas at the fuel cell stack anode inlet 41. Also, an additional control loop is provided to control the flow rate of air in the air bypass inlet gas flow path 240 in order to maintain the temperature of the anode inlet gas at the fuel cell stack anode inlet 41 at a predetermined temperature. Increasing the oxidant flow rate in the air bypass inlet gas flow path 240 reduces the temperature of oxidant entering the reformer heat exchanger oxidant inlet 161. This reduction in oxidant temperature will reduce the temperature of the anode inlet gas at the reformer outlet 72 and also reduce the equilibrium temperature of the reforming reaction. On the other hand, decreasing the oxidant flow rate in the air bypass inlet gas flow path 240 increases the temperature of oxidant entering the reformer heat exchanger oxidant inlet 161. This increase in oxidant temperature increases the temperature of the anode inlet gas at the reformer outlet 72 and also increases the equilibrium temperature of the reforming reaction. In this embodiment the flow rate of oxidant through the air bypass inlet gas flow path 260 controls the temperature of the fuel cell cathode inlet 61A and the oxidant flow rate in the air bypass inlet gas flow path 240 controls the temperature of the reformate flow from the reformer outlet 72.

Increasing the flow rate of oxidant in the additional air bypass inlet gas flow path 260 reduces the temperature of the oxidant stream at the fuel cell stack cathode inlet 61. Conversely, reducing the flow rate of oxidant in the additional air bypass inlet gas flow path 260 increases the temperature of the oxidant stream at the fuel cell stack cathode inlet 61.

Increasing the flow rate of the oxidant in the air bypass inlet gas flow path 240 reduces the temperature of both the anode inlet gas at the reformer outlet 72 and the cathode inlet gas at the reformer heat exchanger oxidant outlet 162. Conversely, reducing the flow rate of the oxidant in the air bypass inlet gas flow path 240 increases the temperature of both the anode inlet gas at the reformer outlet 72 and the cathode inlet gas at the reformer heat exchanger oxidant outlet 162. For example, if the control means 200 determines that the fuel cell stack anode inlet gas temperature sensor T3 is to be maintained at a higher or lower temperature, the oxidant flow rate in the air bypass inlet gas flow path 240 may be increased or decreased, respectively, by controlling blower 140'. On the other hand, if the control means 200 determines that the fuel cell stack cathode inlet gas temperature sensor T1 is to be maintained at a higher or lower temperature, the oxidant flow rate in the air bypass inlet gas flow path 240 and/or additional air bypass inlet gas flow path 260 may be increased or decreased, respectively, by controlling blower 140' for the oxidant flow rate in the air bypass inlet gas flow path 240 or blower 140" for the oxidant flow rate in the additional air bypass inlet gas flow path 260.

Figure 5:
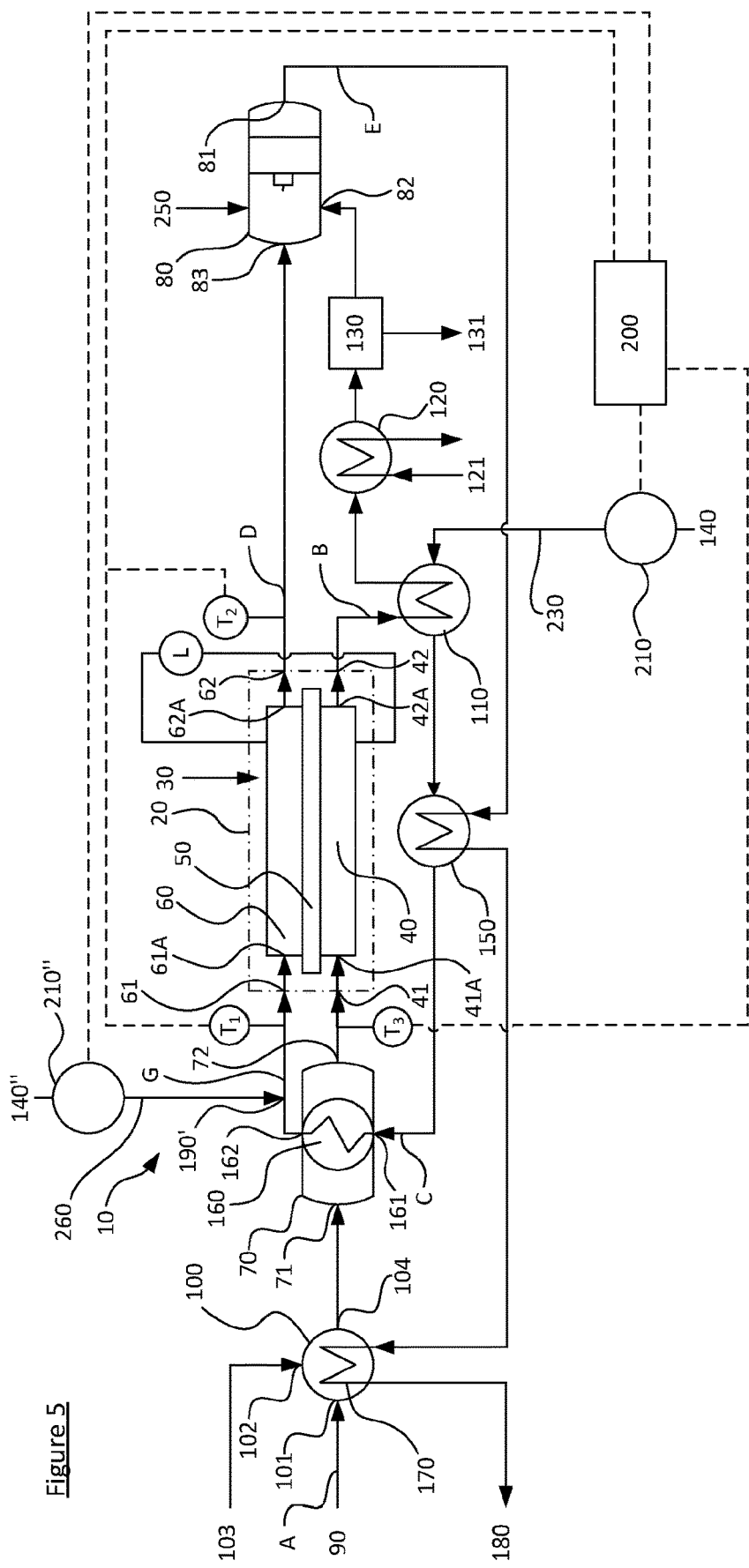
FIG. 5 shows a schematic of an alternative fuel cell system according to the present invention.

A fourth embodiment, as shown in FIG. 5, provides a single oxidant bypass stream, air bypass inlet gas flow path 260, which is arranged to merge with the main cathode inlet gas flow path 230 between the reformer heat exchanger oxidant outlet 162 and fuel cell stack cathode inlet 61. In this arrangement the layout of reformer heat exchanger 160 and air bypass inlet gas flow path 260 means that at the boundary of the fuel cell stack 20 the anode inlet gas fluid temperature will be higher than the cathode inlet gas fluid temperature. Increasing the temperature of the anode inlet gas at the reformer outlet 72 also increases the equilibrium temperature of the reforming reaction reached within the reformer heat exchanger 160 and hence increases the concentration of hydrogen within the anode inlet gas at the fuel cell stack anode inlet 41. Increased hydrogen concentration within the anode inlet gas reduces the stress on the fuel cell 30 and reduces the amount of internal reforming required.

The control loops required to control the fuel cell system 10 of the fourth embodiment are the same as the embodiment of FIG. 1, but in the fourth embodiment the control loops control the oxidant flow rate in the additional air bypass inlet gas flow path 260, rather than the air bypass inlet gas flow path 240, based on the temperature measurement at the fuel cell stack cathode inlet gas temperature sensor T1.

In the fourth embodiment, as in the third embodiment, an additional temperature sensor T3 is provided, which is a fuel cell stack anode inlet gas temperature sensor T3. T3 provides additional temperature data but is not essential for the control loops and control means 200 of the fourth embodiment to operate.

Figure 6:
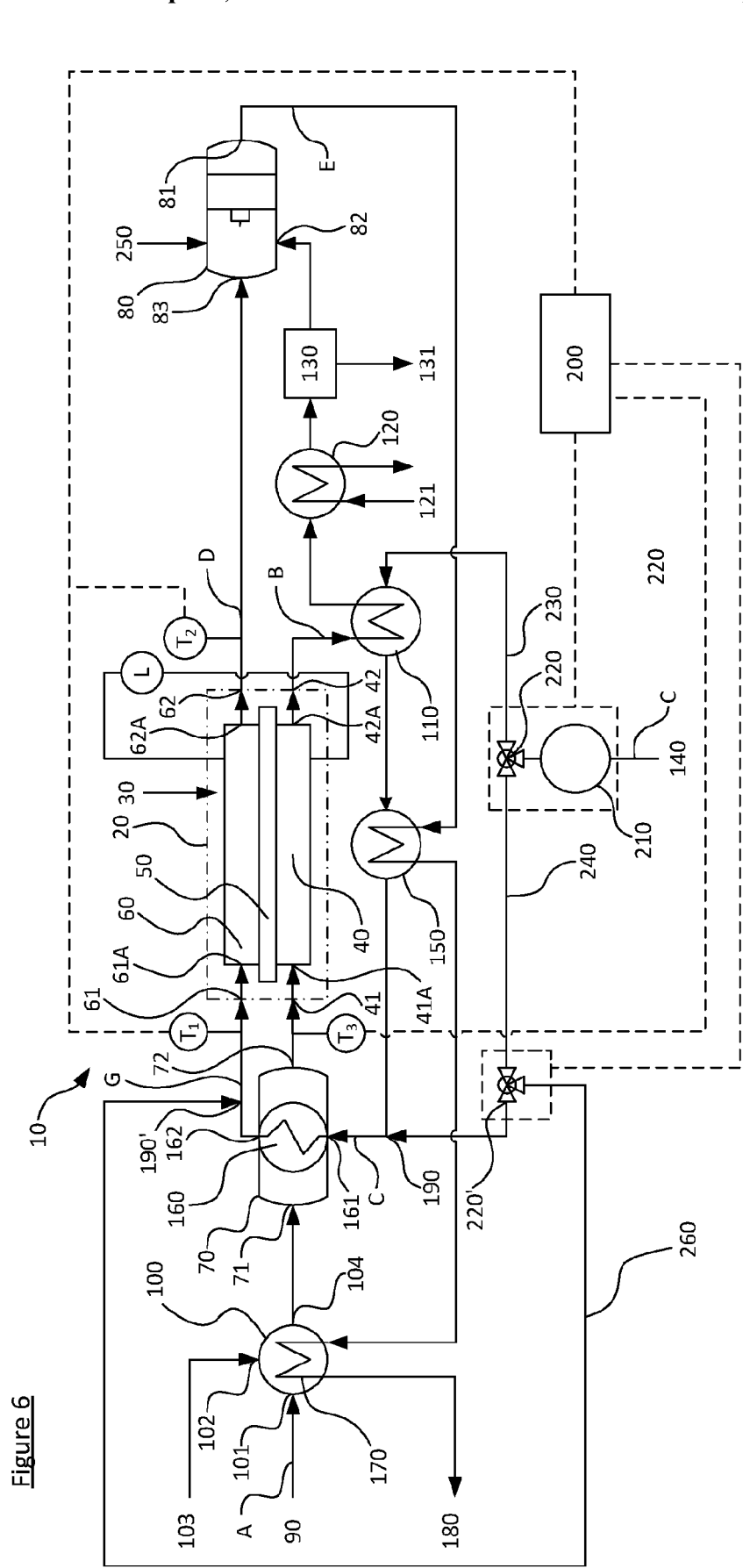
FIG. 6 shows a schematic of an alternative fuel cell system according to the present invention.

A fifth embodiment, which is shown in FIG. 6, is similar to the first embodiment and only differences will be described. An additional valve/separator 220' or splitter is provided in the air bypass inlet gas flow path 240. The additional valve/separator 220' connects the air bypass inlet gas flow path 240 to an additional air bypass inlet gas flow path 260. The additional valve/separator 220' is controlled by control means 200 so as to split the flow of inlet air between the air bypass inlet gas flow path 240 and the additional air bypass inlet gas flow path 260.

In the fifth embodiment, as in the third and fourth embodiments, an additional temperature sensor T3 is provided, which is a fuel cell stack anode inlet gas temperature sensor T3. The control means 200 of the fifth embodiment works in a similar way to that of the third embodiment except that the additional valve/separator 220' is controlled by control means 200 instead of blower 210'' to control the flow of inlet air in the additional air bypass inlet gas flow path 260.

Additional air bypass inlet gas flow path 260 is defined from oxidant inlet 140 to blower 210 to valve/separator 220 to valve/separator 220' to air bypass inlet 190' to fuel cell stack cathode inlet 61 to fuel cell cathode inlet 61A. Thus the air bypass inlet gas flow path 260 meets the cathode inlet gas fluid flow path (C) at air bypass inlet 190' which is between the reformer heat exchanger 160 (and downstream of it) and the fuel cell stack cathode inlet 61. The arrangement of this embodiment allows the flow rate of oxidant to both the reformer heat exchanger 160 and the fuel cell stack cathode inlet 61 to be controlled from a single source.

Reference signs are incorporated in the claims solely to ease their understanding, and do not limit the scope of the claims.

The present invention is not limited to the above embodiments only, and other embodiments will be readily apparent to one of ordinary skill in the art without departing from the scope of the appended claims.

TABLE 1

| Time (S) | TGB Exhaust (Deg C.) | Reformer Air inlet (Deg C.) | Reformer Air outlet (Deg C.) | Stack Air inlet (Deg C.) | Stack Air Outlet (Deg C.) | Stack Electrical Power Output (W) |
|---|---|---|---|---|---|---|
| 0 | 168 | 177 | 162 | 161 | 160 | 0 |
| 100 | 166 | 175 | 162 | 161 | 159 | 0 |
| 510 | 657 | 368 | 188 | 185 | 159 | 0 |
| 710 | 655 | 445 | 304 | 297 | 165 | 0 |
| 910 | 658 | 442 | 373 | 366 | 182 | 0 |
| 1110 | 659 | 441 | 408 | 401 | 206 | 2 |
| 1310 | 662 | 438 | 428 | 422 | 231 | 2 |
| 1510 | 662 | 434 | 439 | 433 | 256 | 2 |
| 1710 | 660 | 428 | 446 | 440 | 278 | 2 |
| 1910 | 658 | 424 | 449 | 443 | 298 | 2 |
| 2110 | 660 | 422 | 450 | 445 | 315 | 3 |
| 2310 | 660 | 418 | 451 | 446 | 330 | 3 |
| 2510 | 661 | 415 | 451 | 447 | 344 | 3 |
| 2710 | 665 | 520 | 481 | 475 | 355 | 6 |
| 2910 | 693 | 468 | 495 | 490 | 372 | 8 |
| 3110 | 711 | 469 | 497 | 492 | 388 | 9 |
| 3310 | 729 | 568 | 540 | 533 | 403 | 8 |
| 3510 | 750 | 578 | 556 | 549 | 421 | 8 |
| 3710 | 771 | 578 | 568 | 561 | 438 | 8 |
| 3910 | 790 | 574 | 575 | 569 | 454 | 8 |
| 4110 | 810 | 566 | 580 | 574 | 469 | 8 |
| 4310 | 819 | 555 | 582 | 577 | 482 | 8 |
| 4510 | 820 | 552 | 583 | 577 | 493 | 8 |
| 4710 | 822 | 533 | 580 | 575 | 503 | 269 |
| 4910 | 813 | 566 | 575 | 570 | 512 | 372 |
| 5110 | 811 | 564 | 576 | 571 | 520 | 435 |
| 5310 | 806 | 564 | 576 | 571 | 527 | 508 |
| 5510 | 803 | 564 | 576 | 572 | 535 | 571 |
| 5710 | 798 | 556 | 575 | 572 | 542 | 667 |
| 5910 | 789 | 550 | 572 | 569 | 550 | 760 |
| 6110 | 823 | 578 | 570 | 568 | 557 | 865 |
| 6310 | 865 | 564 | 574 | 571 | 566 | 1004 |
| 6510 | 850 | 533 | 575 | 573 | 577 | 1027 |
| 6710 | 828 | 530 | 567 | 566 | 585 | 1042 |
| 6910 | 809 | 521 | 570 | 570 | 593 | 1051 |
| 7110 | 794 | 526 | 568 | 568 | 598 | 1056 |
| 7310 | 781 | 527 | 567 | 567 | 603 | 1060 |
| 7510 | 776 | 512 | 558 | 559 | 606 | 1062 |
| 7710 | 773 | 505 | 551 | 552 | 607 | 1063 |
| 7910 | 774 | 511 | 548 | 549 | 607 | 1063 |
| 8110 | 777 | 516 | 548 | 549 | 606 | 1061 |
| 8310 | 780 | 520 | 550 | 550 | 606 | 1061 |
| 8510 | 783 | 520 | 550 | 551 | 606 | 1061 |
| 8710 | 785 | 520 | 551 | 552 | 606 | 1061 |
| 8910 | 788 | 520 | 551 | 552 | 606 | 1061 |

TABLE 1-continued

| Time (S) | TGB Exhaust (Deg C.) | Reformer Air inlet (Deg C.) | Reformer Air outlet (Deg C.) | Stack Air inlet (Deg C.) | Stack Air Outlet (Deg C.) | Stack Electrical Power Output (W) |
|---|---|---|---|---|---|---|
| 9110 | 790 | 519 | 551 | 552 | 606 | 1061 |
| 9310 | 791 | 514 | 550 | 551 | 606 | 1062 |
| 9510 | 793 | 512 | 549 | 550 | 606 | 1062 |
| 9710 | 795 | 514 | 548 | 549 | 607 | 1063 |
| 9910 | 797 | 511 | 548 | 549 | 607 | 1063 |
| 10110 | 799 | 511 | 547 | 548 | 607 | 1063 |
| 10310 | 801 | 508 | 547 | 548 | 607 | 1063 |
| 10510 | 803 | 508 | 546 | 547 | 607 | 1064 |
| 10710 | 805 | 506 | 546 | 547 | 607 | 1064 |
| 10910 | 806 | 503 | 545 | 547 | 607 | 1064 |
| 11110 | 808 | 504 | 545 | 546 | 607 | 1063 |
| 11310 | 810 | 503 | 545 | 546 | 607 | 1062 |
| 11510 | 811 | 501 | 545 | 546 | 607 | 1063 |
| 11710 | 813 | 502 | 544 | 546 | 608 | 1063 |
| 11910 | 812 | 500 | 544 | 545 | 608 | 1063 |
| 12110 | 814 | 499 | 544 | 545 | 608 | 1063 |
| 12310 | 814 | 499 | 543 | 545 | 608 | 1063 |
| 12510 | 817 | 498 | 543 | 545 | 608 | 1064 |
| 12710 | 818 | 500 | 543 | 545 | 608 | 1064 |
| 12910 | 820 | 499 | 543 | 544 | 608 | 1064 |
| 13110 | 820 | 497 | 542 | 544 | 608 | 1064 |
| 13310 | 821 | 498 | 542 | 543 | 608 | 1064 |
| 13510 | 822 | 496 | 542 | 543 | 609 | 1064 |
| 13710 | 823 | 498 | 542 | 543 | 609 | 1064 |
| 13910 | 823 | 496 | 541 | 543 | 609 | 1065 |
| 14110 | 825 | 499 | 541 | 543 | 609 | 1065 |
| 14310 | 825 | 497 | 541 | 543 | 609 | 1065 |
| 14510 | 825 | 498 | 541 | 543 | 609 | 1065 |
| 14710 | 827 | 498 | 541 | 543 | 609 | 1065 |
| 14910 | 827 | 497 | 541 | 542 | 609 | 1066 |
| 15110 | 828 | 498 | 540 | 542 | 609 | 1066 |
| 15310 | 828 | 498 | 540 | 542 | 609 | 1066 |
| 15510 | 828 | 497 | 540 | 542 | 609 | 1066 |
| 15710 | 828 | 498 | 540 | 542 | 609 | 1066 |
| 15910 | 829 | 497 | 540 | 542 | 609 | 1066 |
| 16110 | 829 | 497 | 540 | 542 | 609 | 1066 |
| 16310 | 830 | 498 | 540 | 542 | 609 | 1066 |
| 16510 | 831 | 498 | 540 | 542 | 609 | 1067 |
| 16710 | 828 | 498 | 540 | 542 | 610 | 1067 |
| 16910 | 829 | 498 | 540 | 542 | 610 | 1067 |
| 17110 | 830 | 498 | 540 | 542 | 610 | 1067 |
| 17310 | 830 | 498 | 540 | 542 | 610 | 1067 |
| 17510 | 831 | 498 | 540 | 542 | 610 | 1067 |
| 17710 | 831 | 498 | 540 | 542 | 610 | 1067 |
| 17910 | 832 | 499 | 540 | 542 | 610 | 1067 |
| 18110 | 831 | 498 | 540 | 542 | 610 | 1067 |
| 18310 | 831 | 498 | 540 | 542 | 610 | 1067 |
| 18510 | 831 | 498 | 540 | 542 | 610 | 1067 |
| 18710 | 832 | 498 | 540 | 542 | 610 | 1067 |
| 18910 | 832 | 498 | 540 | 542 | 610 | 1067 |
| 19110 | 832 | 498 | 540 | 542 | 610 | 1067 |
| 19310 | 831 | 498 | 540 | 542 | 610 | 1067 |
| 19510 | 831 | 498 | 540 | 542 | 610 | 1067 |
| 19710 | 830 | 497 | 540 | 542 | 610 | 1067 |
| 19910 | 830 | 497 | 540 | 542 | 610 | 1068 |
| 20110 | 830 | 498 | 540 | 542 | 610 | 1067 |
| 20310 | 831 | 498 | 540 | 542 | 610 | 1067 |
| 20510 | 830 | 498 | 540 | 542 | 610 | 1068 |
| 20710 | 831 | 499 | 540 | 542 | 610 | 1068 |
| 20910 | 831 | 497 | 540 | 542 | 610 | 1068 |
| 21110 | 831 | 498 | 540 | 542 | 610 | 1068 |
| 21310 | 831 | 499 | 540 | 542 | 610 | 1068 |
| 21510 | 830 | 498 | 540 | 542 | 610 | 1067 |
| 21710 | 831 | 498 | 540 | 542 | 610 | 1068 |
| 21910 | 831 | 498 | 540 | 542 | 610 | 1068 |
| 22110 | 832 | 498 | 540 | 542 | 610 | 1067 |
| 22310 | 831 | 498 | 540 | 542 | 610 | 1068 |
| 22510 | 830 | 497 | 540 | 542 | 610 | 1068 |
| 22710 | 829 | 497 | 540 | 542 | 610 | 1067 |
| 22910 | 830 | 498 | 540 | 542 | 610 | 1068 |
| 23110 | 830 | 497 | 540 | 542 | 610 | 1068 |
| 23310 | 831 | 498 | 540 | 542 | 610 | 1068 |
| 23510 | 831 | 498 | 540 | 542 | 610 | 1068 |
| 23710 | 831 | 498 | 540 | 542 | 610 | 1068 |

TABLE 1-continued

| Time (S) | TGB Exhaust (Deg C.) | Reformer Air inlet (Deg C.) | Reformer Air outlet (Deg C.) | Stack Air inlet (Deg C.) | Stack Air Outlet (Deg C.) | Stack Electrical Power Output (W) |
|---|---|---|---|---|---|---|
| 23910 | 830 | 498 | 540 | 542 | 610 | 1068 |
| 24110 | 831 | 498 | 540 | 542 | 610 | 1069 |
| 24310 | 831 | 497 | 540 | 542 | 610 | 1068 |
| 24510 | 832 | 499 | 540 | 542 | 610 | 1069 |
| 24710 | 832 | 498 | 540 | 542 | 610 | 1069 |
| 24910 | 831 | 498 | 540 | 542 | 610 | 1069 |
| 25110 | 831 | 498 | 540 | 542 | 610 | 1069 |
| 25310 | 831 | 497 | 540 | 542 | 610 | 1069 |
| 25510 | 832 | 498 | 540 | 542 | 610 | 1069 |
| 25710 | 831 | 498 | 540 | 542 | 610 | 1068 |
| 25910 | 833 | 498 | 540 | 542 | 610 | 1069 |
| 26110 | 833 | 497 | 540 | 542 | 610 | 1069 |
| 26310 | 832 | 497 | 540 | 542 | 610 | 1069 |
| 26510 | 831 | 497 | 540 | 542 | 610 | 1069 |
| 26710 | 830 | 498 | 540 | 542 | 610 | 1069 |
| 26910 | 831 | 497 | 540 | 542 | 610 | 1069 |
| 27110 | 831 | 497 | 540 | 542 | 610 | 1069 |
| 27310 | 831 | 499 | 540 | 542 | 610 | 1069 |
| 27510 | 831 | 498 | 540 | 542 | 610 | 1069 |
| 27710 | 831 | 497 | 540 | 542 | 610 | 1069 |
| 27910 | 831 | 496 | 540 | 542 | 610 | 1069 |
| 28110 | 832 | 498 | 540 | 542 | 610 | 1069 |
| 28310 | 832 | 498 | 540 | 542 | 610 | 1069 |
| 28510 | 834 | 500 | 540 | 542 | 610 | 1069 |
| 28710 | 833 | 498 | 540 | 542 | 610 | 1069 |
| 28910 | 834 | 499 | 540 | 542 | 610 | 1069 |
| 29110 | 834 | 498 | 540 | 542 | 610 | 1069 |
| 29310 | 834 | 497 | 540 | 542 | 610 | 1069 |
| 29510 | 833 | 499 | 540 | 542 | 610 | 1069 |
| 29710 | 834 | 498 | 540 | 542 | 610 | 1069 |
| 29910 | 833 | 498 | 540 | 542 | 610 | 1070 |
| 30110 | 833 | 497 | 540 | 542 | 610 | 1069 |

REFERENCE SIGNS

10—fuel cell system
20—fuel cell stack
30—fuel cell
40—anode side
41—fuel cell stack anode inlet
41A—fuel cell anode inlet
42—fuel cell stack anode off-gas outlet
42A—fuel cell anode outlet
50—electrolyte layer
60—cathode side
61—fuel cell stack cathode inlet
61A—fuel cell cathode inlet
62—fuel cell stack cathode off-gas outlet
62A—fuel cell cathode outlet
70—steam reformer
71—reformer inlet
72—reformer outlet
80—tail-gas burner
81—tail-gas burner exhaust
82—anode off-gas inlet
83—cathode off-gas inlet
90—fuel source
100—evaporator
101—fuel inlet
102—water inlet
103—water supply
104—evaporator exhaust
110—anode off-gas heat exchanger
120—condenser heat exchanger
121—cooling circuit
130—separator
131—separator condensate outlet
140—oxidant inlet
140'—oxidant inlet
140"—oxidant inlet
150—air pre-heater heat exchanger
160—reformer heat exchanger
161—reformer heat exchanger oxidant inlet
162—reformer heat exchanger oxidant outlet
170—evaporator heat exchanger
180—fuel cell system exhaust
190—air bypass inlet
190'—air bypass inlet
200—control means
210—blower
210'—blower
210"—blower
220—valve/separator
220'—valve/separator
230—main cathode inlet gas flow path
240—air bypass inlet gas flow path
250—fuel source
260—air bypass inlet gas flow path
A—anode inlet gas fluid flow path
B—anode off-gas fluid flow path
C—cathode inlet gas fluid flow path
D—cathode off-gas fluid flow path
E—tail-gas burner off-gas fluid flow path
G—reformer cathode off-gas fluid flow path
L—electrical load
T1—fuel cell stack cathode inlet gas temperature sensor
T2—fuel cell stack cathode off-gas temperature sensor
T3—fuel cell stack anode inlet gas temperature sensor

The invention claimed is:

1. An intermediate-temperature solid oxide fuel cell (IT-SOFC) system comprising:
(i) at least one fuel cell stack comprising at least one intermediate-temperature solid oxide fuel cell, and having an anode inlet, a cathode inlet, an anode off-gas outlet, a cathode off-gas outlet, and defining separate flow paths for flow of anode inlet gas, cathode inlet gas, anode off-gas and cathode off-gas; and
(ii) a steam reformer adapted to perform a reaction that reforms a hydrocarbon fuel to a reformate, and comprising a reformer inlet for anode inlet gas, a reformer outlet for exhausting anode inlet gas, and a reformer heat exchanger;
and defining:
(a) an anode inlet gas fluid flow path from a fuel source to said steam reformer to said at least one fuel cell stack anode inlet;
(b) an anode off-gas fluid flow path from said at least one fuel cell stack anode off-gas outlet to a fuel cell system exhaust;
(c) a cathode inlet gas fluid flow path from an at least one oxidant inlet to said at least one fuel cell stack cathode inlet; and
(d) a cathode off-gas fluid flow path from said at least one fuel cell stack cathode off-gas outlet to said fuel cell system exhaust;
wherein said reformer heat exchanger is constituted by a parallel-flow heat exchanger in fluid flow communication with (i) said at least one oxidant inlet and said at least one fuel cell stack cathode inlet, and (ii) said fuel source and said at least one fuel cell stack anode inlet, and is positioned to exchange heat between said anode inlet gas in a portion of said anode inlet gas fluid flow path between said reformer inlet and said reformer outlet and said cathode inlet gas.

2. An intermediate-temperature solid oxide fuel cell (IT-SOFC) system according to claim 1, additionally comprising an at least one oxidant heater located in said cathode inlet gas fluid flow path between said oxidant inlet and said reformer heat exchanger, an at least one oxidant blower, a fuel cell stack cathode inlet gas temperature sensor, a fuel cell stack cathode off-gas temperature sensor, said at least one oxidant blower and the heating of inlet oxidant by said at least one oxidant heater being arranged to maintain said cathode inlet gas temperature sensor at or about a predetermined temperature, and said cathode off-gas temperature sensor at or about a predetermined temperature.

3. An intermediate-temperature solid oxide fuel cell (IT-SOFC) system according to claim 1, additionally comprising:
an inlet oxidant main path from said at least one oxidant inlet to said reformer heat exchanger to said at least one fuel cell stack cathode inlet; and
an at least one inlet oxidant bypass from said at least one oxidant inlet to said at least one fuel cell stack cathode inlet, and/or from said at least one oxidant inlet to said reformer heat exchanger to said at least one fuel cell stack cathode inlet.

4. An intermediate-temperature solid oxide fuel cell (IT-SOFC) system according to claim 3, wherein said at least one inlet oxidant bypass comprises at least two inlet oxidant bypasses, one from said at least one oxidant inlet to said at least one fuel cell stack cathode inlet, and another from said at least one oxidant inlet to said reformer heat exchanger to said at least one fuel cell stack cathode inlet.

5. An intermediate-temperature solid oxide fuel cell (IT-SOFC) system according to claim 3, additionally comprising an at least one oxidant blower, the at least one blower being located in said inlet oxidant main path and/or said at least one inlet oxidant bypass.

6. An intermediate-temperature solid oxide fuel cell (IT-SOFC) system according to claim 3, additionally comprising at least one adjustable inlet oxidant flow splitter, to control inlet oxidant flow between said at least one inlet oxidant bypass and said inlet oxidant main path.

7. An intermediate-temperature solid oxide fuel cell (IT-SOFC) system according to claim 4, additionally comprising an adjustable inlet oxidant flow splitter, to control inlet oxidant flow between said one inlet oxidant bypass and said another inlet oxidant bypass.

8. An intermediate-temperature solid oxide fuel cell (IT-SOFC) system according to claim 2, additionally comprising:
an adjustable inlet oxidant flow splitter;
an inlet oxidant bypass; and
an inlet oxidant main path,
said adjustable inlet oxidant flow splitter being arranged to adjust inlet oxidant flow between said inlet oxidant bypass and said inlet oxidant main path, said at least one oxidant heater located in said inlet oxidant main path.

9. An intermediate-temperature solid oxide fuel cell (IT-SOFC) system according to claim 2, said oxidant heater comprising at least one heat exchanger.

10. An intermediate-temperature solid oxide fuel cell (IT-SOFC) system according to claim 9, wherein said at least one heat exchanger of said at least one oxidant heater is an oxidant pre-heater heat exchanger in fluid flow communication with at least one of said fuel cell stack anode off-gas outlet and fuel cell stack cathode off-gas outlet, and arranged for exchanging heat between (a) gas flow from said at least one of said fuel cell stack anode off-gas outlet and said fuel cell stack cathode off-gas outlet, and (b) said inlet oxidant.

11. An intermediate-temperature solid oxide fuel cell (IT-SOFC) system according to claim 10, additionally comprising a tail-gas burner in fluid flow communication with said at least one fuel cell stack anode and cathode off-gas outlets, having a tail-gas burner exhaust, defining a fluid flow path from said at least one fuel cell stack anode and cathode off-gas outlets to said tail-gas burner exhaust to said oxidant pre-heater heat exchanger, to said fuel cell system exhaust.

12. An intermediate-temperature solid oxide fuel cell (IT-SOFC) system according to claim 11, said oxidant heater comprising an anode off-gas heat exchanger in fluid flow communication with said at least one fuel cell stack anode off-gas outlet, and arranged for exchanging heat between (a) gas flow from said anode off-gas outlet, and (b) said inlet oxidant.

13. An intermediate-temperature solid oxide fuel cell (IT-SOFC) system according to claim 12, additionally comprising a condenser heat exchanger located in the anode off-gas fluid flow path between said anode off-gas heat exchanger and said tail-gas burner, wherein said condenser heat exchanger is arranged for exchanging heat between said anode off-gas and a cooling fluid.

14. An intermediate-temperature solid oxide fuel cell (IT-SOFC) system according to claim 13, additionally comprising a separator located in the anode off-gas fluid flow path between said condenser heat exchanger and said tail-gas burner, wherein said separator is arranged to separate condensate from said anode off-gas.

15. An intermediate-temperature solid oxide fuel cell (IT-SOFC) system according to claim 14, said separator additionally comprising a separator condensate outlet, and arranged to exhaust said condensate via said condensate outlet.

16. An intermediate-temperature solid oxide fuel cell (IT-SOFC) system according to claim 1, additionally comprising:
an evaporator having a fuel inlet in fluid flow communication with said fuel source, a water inlet in fluid flow communication with a water source, and an evaporator exhaust, the evaporator located in the anode inlet gas fluid flow path between said fuel source and said steam reformer,
and an evaporator heat exchanger located in the fluid flow path between (a) at least one of said anode off-gas outlet and cathode off-gas outlet, and (b) said fuel cell system exhaust,
wherein:
said evaporator heat exchanger is arranged for exchanging heat between (a) gas flow from said at least one of said anode off-gas outlet and said cathode off-gas outlet, and (b) at least one of said anode inlet gas and said water.

17. An intermediate-temperature solid oxide fuel cell (IT-SOFC) system according to claim 1, additionally comprising:
an at least one inlet oxidant bypass from said at least one oxidant inlet to said at least one fuel cell stack cathode inlet;
an inlet oxidant main path from said at least one oxidant inlet to said reformer heat exchanger to said at least one fuel cell stack cathode inlet; and
an adjustable inlet oxidant flow splitter located in said at least one inlet oxidant bypass and said inlet oxidant main path, to control inlet oxidant flow between said at least one inlet oxidant bypass and said inlet oxidant main path.

18. A method of operating an intermediate-temperature solid oxide fuel cell system comprising,
(i) at least one fuel cell stack comprising at least one intermediate-temperature solid oxide fuel cell, and having an anode inlet, a cathode inlet, an anode off-gas outlet, a cathode off-gas outlet, and defining separate flow paths for flow of anode inlet gas, cathode inlet gas, anode off-gas and cathode off-gas; and
(ii) a steam reformer adapted to perform a reaction that reforms a hydrocarbon fuel to a reformate, and comprising a reformer inlet for anode inlet gas, a reformer outlet for exhausting anode inlet gas, and a reformer heat exchanger;
and defining:
(a) an anode inlet gas fluid flow path from a fuel source to said steam reformer to said at least one fuel cell stack anode inlet;
(b) an anode off-gas fluid flow path from said at least one fuel cell stack anode off-gas outlet to a fuel cell system exhaust;
(c) a cathode inlet gas fluid flow path from an at least one oxidant inlet to said at least one fuel cell stack cathode inlet; and
(d) a cathode off-gas fluid flow path from said at least one fuel cell stack cathode off-gas outlet to said fuel cell system exhaust;
wherein said reformer heat exchanger is constituted by a parallel-flow heat exchanger in fluid flow communication with (i) said at least one oxidant inlet and said at least one fuel cell stack cathode inlet, and (ii) said fuel source and said at least one fuel cell stack anode inlet, and is positioned to exchange heat between said anode inlet gas in a portion of said anode inlet gas fluid flow path between said reformer inlet and said reformer outlet and said cathode inlet gas,
the method comprising:
(i) passing fuel from a fuel source to said steam reformer;
(ii) passing heated inlet oxidant from said oxidant inlet to said reformer heat exchanger such that heat is exchanged between said fuel in said portion of said anode inlet gas fluid flow path between said reformer inlet and said reformer outlet and said heated inlet oxidant;
(iii) passing anode inlet gas from said steam reformer to said at least one fuel cell stack anode inlet, and passing inlet oxidant from said reformer heat exchanger to said at least one fuel cell stack cathode inlet; and
(iv) operating the at least intermediate-temperature solid oxide fuel cell stack.

19. An intermediate-temperature solid oxide fuel cell (IT-SOFC) system comprising:
(i) at least one fuel cell stack comprising at least one intermediate-temperature solid oxide fuel cell, and having an anode inlet, a cathode inlet, an anode off-gas outlet, a cathode off-gas outlet, and defining separate flow paths for flow of anode inlet gas, cathode inlet gas, anode off-gas and cathode off-gas; and
(ii) a steam reformer adapted to perform a reaction that reforms a hydrocarbon fuel to a reformate, and comprising a reformer inlet for anode inlet gas, a reformer outlet for exhausting anode inlet gas, and a reformer heat exchanger;
and defining:
(a) an anode inlet gas fluid flow path from a fuel source to said steam reformer to said at least one fuel cell stack anode inlet;
(b) an anode off-gas fluid flow path from said at least one fuel cell stack anode off-gas outlet to a fuel cell system exhaust;
(c) a cathode inlet gas fluid flow path from an at least one oxidant inlet to said at least one fuel cell stack cathode inlet; and
(d) a cathode off-gas fluid flow path from said at least one fuel cell stack cathode off-gas outlet to said fuel cell system exhaust;
wherein said reformer heat exchanger is constituted by a parallel-flow heat exchanger in fluid flow communication with (i) said at least one oxidant inlet and said at least one fuel cell stack cathode inlet, and (ii) said fuel source and said at least one fuel cell stack anode inlet, and is positioned to exchange heat between said anode inlet gas in a portion of said anode inlet gas fluid flow path between said reformer inlet and said reformer outlet and said cathode inlet gas;
the system further comprising:
at least one oxidant heater located in said cathode inlet gas fluid flow path between said oxidant inlet and said reformer heat exchanger, an at least one oxidant blower, a fuel cell stack cathode inlet gas temperature sensor, a fuel cell stack cathode off-gas temperature sensor, said at least one oxidant blower and the heating of inlet oxidant by said at least one oxidant heater being arranged to maintain said cathode inlet gas temperature sensor at or about a predetermined temperature, and said cathode off-gas temperature sensor at or about a predetermined temperature;
an inlet oxidant main path from said at least one oxidant inlet to said reformer heat exchanger to said at least one fuel cell stack cathode inlet; and
an at least one inlet oxidant bypass from said at least one oxidant inlet to said at least one fuel cell stack cathode inlet, and/or from said at least one oxidant inlet to said reformer heat exchanger to said at least one fuel cell stack cathode inlet.

20. An intermediate-temperature solid oxide fuel cell (IT-SOFC) system according to claim 19, wherein said at least one oxidant heater is located in said inlet oxidant main path.

* * * * *